US008666344B2

(12) United States Patent
Baba

(10) Patent No.: US 8,666,344 B2
(45) Date of Patent: Mar. 4, 2014

(54) SATELLITE SIGNAL RECEPTION DEVICE AND CONTROL METHOD FOR A SATELLITE SIGNAL RECEPTION DEVICE

(75) Inventor: Norimitsu Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/565,141

(22) Filed: Aug. 2, 2012

(65) Prior Publication Data
US 2012/0295563 A1 Nov. 22, 2012

Related U.S. Application Data

(62) Division of application No. 12/357,086, filed on Jan. 21, 2009.

(30) Foreign Application Priority Data

Jan. 29, 2008 (JP) ................... 2008-018078

(51) Int. Cl.
*H04B 17/00* (2006.01)
*G01S 19/42* (2010.01)
*G01S 19/23* (2010.01)

(52) U.S. Cl.
USPC .......... 455/226.1; 455/226.2; 455/226.4; 455/12.1; 455/67.7; 455/566; 342/357.25

(58) Field of Classification Search
USPC .......... 455/226.1, 226.2, 226.4, 566, 226.3, 455/230, 3.02, 12.1, 67.11, 67.7, 556.1, 455/557, 130; 342/357.25, 357.62, 357.74, 342/357.63; 368/1, 9–10, 14, 20; 19/23–24, 19/34, 42
See application file for complete search history.

(56) References Cited

U.S. PATENT DOCUMENTS

| | | | |
|---|---|---|---|
| 5,627,548 A * | 5/1997 | Woo et al. ............ | 342/357.57 |
| 6,112,054 A * | 8/2000 | Kita ..................... | 455/12.1 |
| 6,212,133 B1 | 4/2001 | McCoy et al. | |
| 6,240,366 B1 * | 5/2001 | Nagatsuma et al. ....... | 701/469 |
| 6,559,794 B1 * | 5/2003 | Nakajima et al. ........ | 342/357.31 |
| 6,965,760 B1 | 11/2005 | Chen et al. | |
| 7,079,076 B2 * | 7/2006 | Montheard et al. ...... | 342/357.67 |
| 7,388,812 B2 * | 6/2008 | Nakamura ............... | 368/47 |
| 7,852,712 B2 * | 12/2010 | Akiyama ................. | 368/47 |
| 7,920,441 B2 * | 4/2011 | Rostrom ................. | 368/47 |

(Continued)

FOREIGN PATENT DOCUMENTS

| | | |
|---|---|---|
| JP | 07-005084 U | 1/1995 |
| JP | 10073650 A | 3/1998 |

(Continued)

*Primary Examiner* — Pablo Tran

(57) ABSTRACT

A satellite signal reception device has a reception unit that receives a satellite signal transmitted from a positioning information satellite, a reception state display device for displaying the satellite signal reception state, a reception state evaluation unit that determines the reception condition of the satellite signal received by the reception unit, and a display controller that controls the reception state display device to display the reception condition determined by the reception state evaluation unit. The reception state evaluation unit determines the level of the reception condition based on the number of positioning information satellites from which satellite signals are received and the signal level of each received signal, and the display controller controls the mechanical drive unit based on the reception level determining by the reception state evaluation unit to display the reception level using the time display device that displays the time.

4 Claims, 14 Drawing Sheets

(56) References Cited

U.S. PATENT DOCUMENTS

| | | | |
|---|---|---|---|
| 7,974,155 B2* | 7/2011 | Matsuzaki | 368/47 |
| 7,983,116 B2* | 7/2011 | Fujisawa | 368/47 |
| 8,169,857 B2* | 5/2012 | Matsuzaki | 368/47 |
| 8,188,916 B2* | 5/2012 | Shingyoji | 342/357.74 |
| 2004/0243307 A1 | 12/2004 | Geelen | |
| 2006/0119506 A1* | 6/2006 | Montheard et al. | 342/357.12 |
| 2007/0201313 A1* | 8/2007 | Rudolph et al. | 368/47 |
| 2007/0210957 A1* | 9/2007 | Brodie et al. | 342/357.06 |
| 2009/0079630 A1 | 3/2009 | Baba et al. | |
| 2009/0135674 A1 | 5/2009 | Matsuzaki | |

FOREIGN PATENT DOCUMENTS

| | | |
|---|---|---|
| JP | 2000-304842 | 11/2000 |
| JP | 2001-124842 | 5/2001 |
| JP | 2002-181915 A | 6/2002 |
| JP | 2006-153651 A | 6/2006 |
| JP | 2006-292532 A | 10/2006 |
| JP | 2009-079982 | 4/2009 |

* cited by examiner

TIME DISPLAY

PRESS BUTTON B →
← PRESS BUTTON B

POSITION DISPLAY

PRESS BUTTON A FOR 3 SECONDS OR MORE

PRESS BUTTON A

PRESS BUTTON A

PRESS BUTTON A FOR 3 SECONDS OR MORE

RECEIVE SIGNAL

LEVEL 2

LEVEL 1

LEVEL 0

FIG. 13A
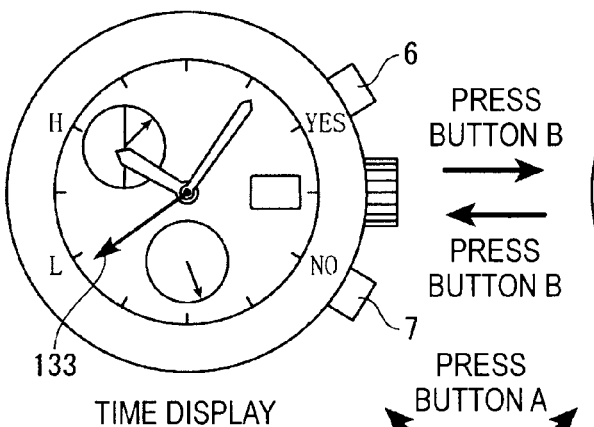
TIME DISPLAY
PRESS BUTTON B →
← PRESS BUTTON B
FIG. 13B
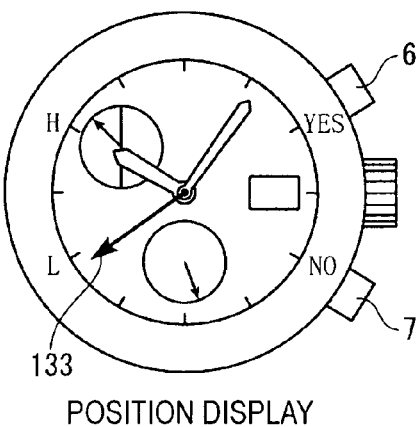
POSITION DISPLAY
PRESS BUTTON A ↑↓ PRESS BUTTON A
PRESS BUTTON A
PRESS BUTTON A ↑↓ PRESS BUTTON A
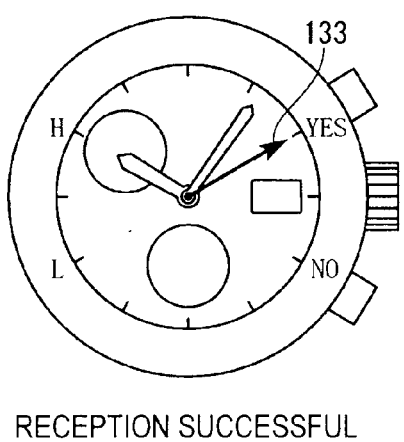
RECEPTION SUCCESSFUL
FIG. 13C
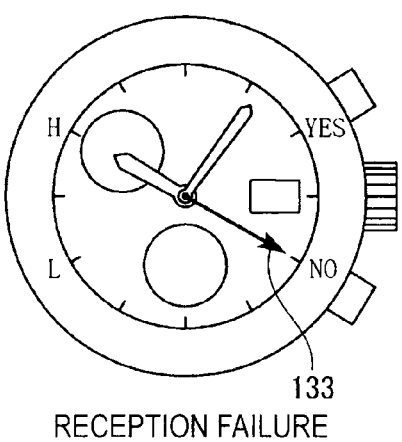
RECEPTION FAILURE
FIG. 13D

WHEN RECEPTION STARTS

WHEN RECEPTION LEVEL IS GOOD

SATELLITE SIGNAL RECEPTION DEVICE AND CONTROL METHOD FOR A SATELLITE SIGNAL RECEPTION DEVICE

CROSS-REFERENCE TO RELATED APPLICATIONS

This application is a divisional of, and claims priority under 35 U.S.C. §120 on, application Ser. No. 12/357,086, filed Jan. 21, 2009, which claims priority under 35 U.S.C. §119 on Japanese Patent Application No. 2008-018078, filed Jan. 29, 2008. Each of these prior applications is hereby incorporated by reference in its entirety.

BACKGROUND

1. Field of Invention

The present invention relates to a satellite signal reception device for receiving signals from positioning information satellites such as GPS satellites, and to a control method for a satellite signal reception device

2. Description of Related Art

The Global Positioning System (GPS) for determining the position of a GPS receiver uses GPS satellites that circle the Earth on known orbits, and positioning devices that measure the current position of a receiver that receives signals from these satellites are commonly available.

Each GPS satellite has an atomic clock on board. Each GPS satellite therefore keeps the time (referred to below as the GPS time or satellite time information) with extremely high precision.

Time adjustment devices (timepieces) that receive signals (navigation messages) from the GPS satellites, acquire the time information, and adjust the displayed time using the decoded time information have also been proposed.

With a satellite signal reception device (positioning device or time adjustment device, for example) for receiving signals from positioning information satellites such as GPS satellites, the reception level changes according to the location where the signals are received (also referred to herein as the "reception site"). Therefore, in order to determine if the reception conditions are good, the user of the satellite signal reception device is preferably able to know the reception condition expressed as a level (the "reception level" below).

Japanese Unexamined Patent Appl. Pub. JP-A-H10-73650 teaches a car navigation device that displays the reception level of each GPS satellite using a bar graph as an example of a positioning device having a function for displaying the reception level.

While the technology taught in Japanese Unexamined Patent Appl. Pub. JP-A-H10-73650 enables a person that understands the operation of a GPS satellite to determine the reception conditions by displaying the reception level of each GPS satellite separately, there is the problem that it is difficult for the general user that does not know how the GPS system works to determine the reception conditions.

More specifically, if the reception level of all GPS satellites displayed is high, or if the reception level of all GPS satellites displayed is low, the general user will typically decide that reception conditions are good, or that they are poor.

However, when the reception level of some GPS satellites is high and the reception level of other GPS satellites is low, it is difficult for the typical user to determine whether reception may be continued from the current location or whether the user should move to a different site with better reception. More particularly, the positioning process normally requires receiving signals from four GPS satellites. However, if the user does not know this, the user is very likely to continue reception from the same location when the reception level of only one to three GPS satellites is high, and thus continues the reception process even though the position cannot be determined accurately.

A satellite signal reception device enabling even general users to easily and unerringly know the reception condition is therefore desirable.

In order to display the reception level for each of a plurality of GPS satellites as described in Japanese Unexamined Patent Appl. Pub. JP-A-H10-73650, a relatively large display device is needed in order to display the reception levels. While this is possible in a car navigation system such as taught in Japanese Unexamined Patent Appl. Pub. JP-A-H10-73650, it is difficult to use the technology taught in Japanese Unexamined Patent Appl. Pub. JP-A-H10-73650 in a small satellite signal reception device that is typically used worn by the user, such as a wristwatch, because the size of the display device that can be used is small.

SUMMARY OF INVENTION

A satellite signal reception device and a control method for a satellite signal reception device according to the present invention enable easily knowing the reception condition and enable deployment in small devices such as wristwatches.

A first aspect of the invention is a satellite signal reception device including a reception unit that receives a satellite signal transmitted from a positioning information satellite, a reception state display device for displaying the satellite signal reception state, the reception state display device including a mechanical drive unit and a time display device that is driven by the mechanical drive unit to display the time. The satellite signal reception device further includes a reception state evaluation unit that determines the reception condition of the satellite signal received by the reception unit, and a display controller that controls the reception state display device to display the reception condition determined by the reception state evaluation unit. The reception state evaluation unit determines the level of the reception condition based on the number of positioning information satellites from which satellite signals are received and the signal level of each received signal, and the display controller controls the mechanical drive unit based on the reception level determining by the reception state evaluation unit to display the reception level using the time display device that displays the time.

By using the time display device to display the reception level, this aspect of the invention does not require a separate device for displaying the reception level, therefore reduces the number of parts and the cost, simplifies the design, and improves the appearance of the satellite signal reception device.

The reception condition level, also referred to simply as reception level below, may be indicated numerically with values such as 0, 1, and 2, or alphabetically using letters such as L, M, and H.

This aspect of the invention determines and displays the reception level based on the number of positioning information satellites from which satellite signals are received and the level (strength) of each reception signal. Because only a single reception is thus displayed, the user can determine the current reception level more easily than when the reception level is displayed for each of a plurality of positioning information satellites.

In addition, because the reception level can be displayed using a single numeral or letter, for example, the reception state display device can be rendered smaller than when the reception level is displayed for each of a plurality of positioning information satellites. The invention can thus be easily employed in a wristwatch or other similarly small satellite signal reception device.

Furthermore, because it is only necessary to receive signals from one positioning information satellite when adjusting the time, the time adjustment signal reception count is usually set to 1 in the time adjustment mode. However, if a process of receiving signals from two positioning information satellites and comparing the time information from the different satellites to confirm the accuracy of the time information is executed, the time adjustment signal reception count may be set to 2.

Because the invention sets the conditions required to acquire the necessary information separately for the positioning mode and the time adjustment mode, the reception level can be appropriately determined in each mode.

Furthermore, because the reception level is evaluated in three levels, 0 to 2, the use can correctly determine the reception level and the user can thereby be prompted to take appropriate action.

Yet further preferably, the reception state evaluation unit sets level evaluation criteria for determining the level of the reception condition according to the stage of progress in the reception process, and determines the reception condition according to the stage of progress in the reception process, and the display controller displays the reception condition level determined by the reception state evaluation unit according to the stage of the reception process on the reception state display device.

This aspect of the invention can accurately determine the reception level in more levels because the reception level evaluation conditions can be set appropriately according to the progress of the reception process.

Further preferably, the stages of progress in the reception process include a satellite search stage in which a positioning information satellite search process executes, a satellite capture stage in which a satellite capture process for capturing a found satellite executes, a time information acquisition stage in which the satellite signal of the captured positioning information satellite is received and time information is acquired, and a positioning information acquisition stage in which the satellite signal of the captured positioning information satellite is received and positioning information is acquired. The reception state evaluation unit determines the reception condition based on the number of positioning information satellites detected by the search and the level of each reception signal in the satellite search stage, determines the reception condition based on the number of captured positioning information satellites and the level of each reception signal in the satellite capture stage, determines the reception condition based on the number of positioning information satellites from which time information was acquired and the level of each reception signal in the time information acquisition stage, and determines the reception condition based on the number of positioning information satellites from which positioning information was acquired and the level of each reception signal in the positioning information acquisition stage.

The reception level can thus be determined appropriately at each stage of the reception process, the satellite search stage, satellite capture stage, time information acquisition stage, and positioning information acquisition stage. The appropriate reception level can thus be displayed at each stage of the reception process, and the reception level can be determined and displayed accurately and more precisely.

When the satellite signal reception device is employed in an analog timepiece, this aspect of the invention eliminates the need to add parts for displaying the reception level and thus reduces the cost.

In a satellite signal reception device according to another aspect of the invention the time display device includes a hand driven by the mechanical drive unit, and a dial having a scale with markings that are indicated by the hand, and the display controller moves the hand to positions predetermined according to each reception level to display the reception level.

In this embodiment of the invention markings such as H and L denoting high and low reception levels that are pointed to by the second hand, for example, are disposed on a dial, and the reception level can be displayed by causing the second hand, for example, to point to a particular marking. Because a hand that can move 360 degrees can be used the positions denoting the different reception levels can be separately greatly from each other, the hand can be moved dynamically when displaying the reception level, and the user can easily determine the reception condition even when the satellite signal reception device is a small device such as a wristwatch.

Further preferably, the reception unit includes an antenna disposed on the back side of the dial for receiving the satellite signals, and the predetermined positions to which the hand are moved to display the reception levels are set to positions where the hand does not overlap the antenna at a position parallel to the plane of the dial surface when the hand is set to any of the predetermined positions.

The hand not overlapping the antenna at a position parallel to the plane of the dial surface indicates that the when the hand and the antenna are both projected onto the surface of the dial, their projections do not overlap at any position. In other words, in a plan view looking at the hand and the antenna from a point perpendicular to the dial surface, the hand and the antenna do not overlap.

When thus configured the hand is not positioned on the dial side of the antenna when the hand is indicating the reception level. More specifically, when the dial is placed on a level surface with the face up, the hand is not above the antenna, and the hand will therefore not interfere with reception when the satellite signals are received from the face side of the dial. The hand can therefore be used to indicate the reception level while the satellite signal is being received, and a drop in reception performance can be prevented.

In a satellite signal reception device according to another aspect of the invention the time display device includes a date wheel or a day wheel that is driven by the mechanical drive unit, and a window in which the date wheel or day wheel is displayed formed in the dial, symbols representing each reception level are disposed on the date wheel or day wheel, and the display controller moves the date wheel or day wheel so that the symbol disposed thereon representing the reception level is displayed through the window in the dial and the reception level is thereby displayed.

This aspect of the invention can display the reception level by thus disposing symbols such as H and L denoting the reception level on the date wheel bearing date markings or the day wheel bearing weekday markings, and moving the date wheel or day wheel based on the reception level determined by the reception state evaluation unit.

More particularly, because the date wheel or day wheel is shown in the window formed in the dial and the display position is therefore constant, the user can easily know if the reception level is being displayed and user convenience can thus be improved.

Note that if both a date wheel and a day wheel are present, one wheel can be used to display the reception level while the other wheel can be used to display other information such as the reception mode, thereby displaying two types of information simultaneously and thus further improving user convenience.

BRIEF DESCRIPTION OF THE DRAWINGS

FIGS. 13A, 13B, 13C, and 13D illustrate displaying the reception result in a preferred embodiment of the invention.

DESCRIPTION OF THE PREFERRED EMBODIMENTS

Preferred embodiments of the present invention are described below with reference to the accompanying figures.

The embodiments described below are specific preferred embodiments of the present invention and certain technically preferred limitations are therefore also described, but the scope of the present invention is not limited to these embodiments or limitations unless specifically stated below.

Figure 1:
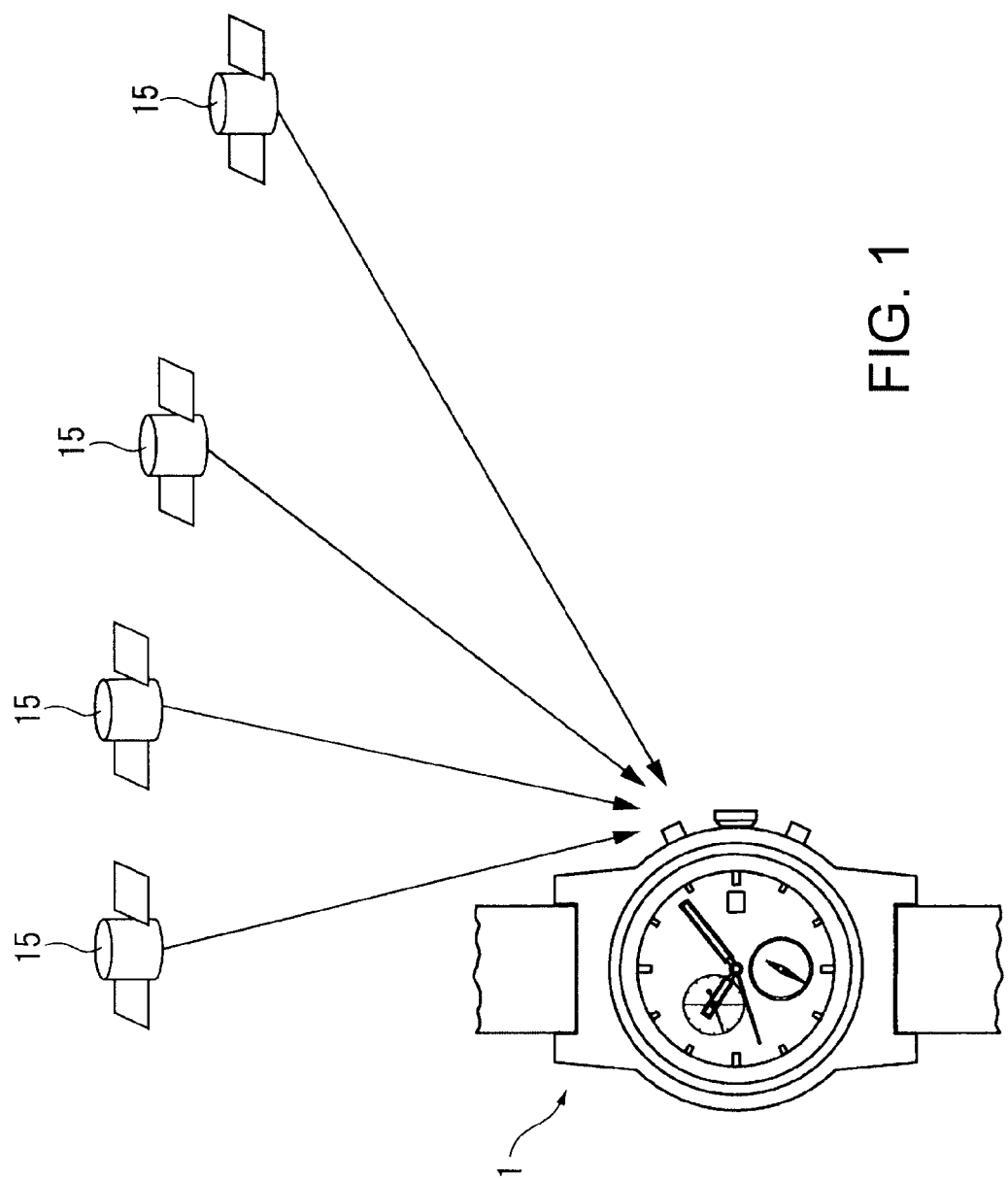
FIG. 1 is a schematic diagram showing a wristwatch with a GPS time adjustment device according to the present invention.
Figure 2:
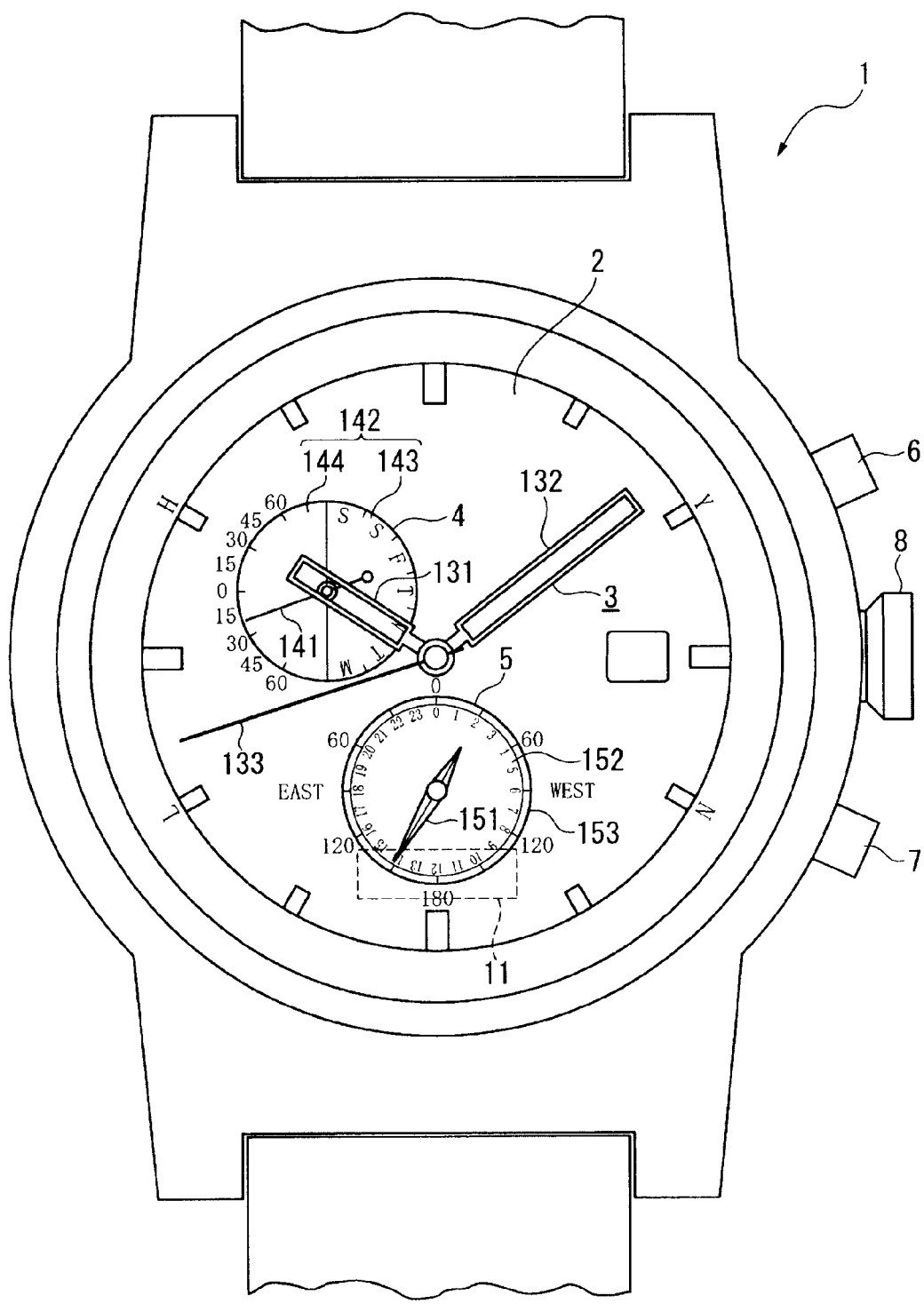
FIG. 2 shows the face of the wristwatch with a GPS time adjustment device shown in FIG. 1.
Figure 3:
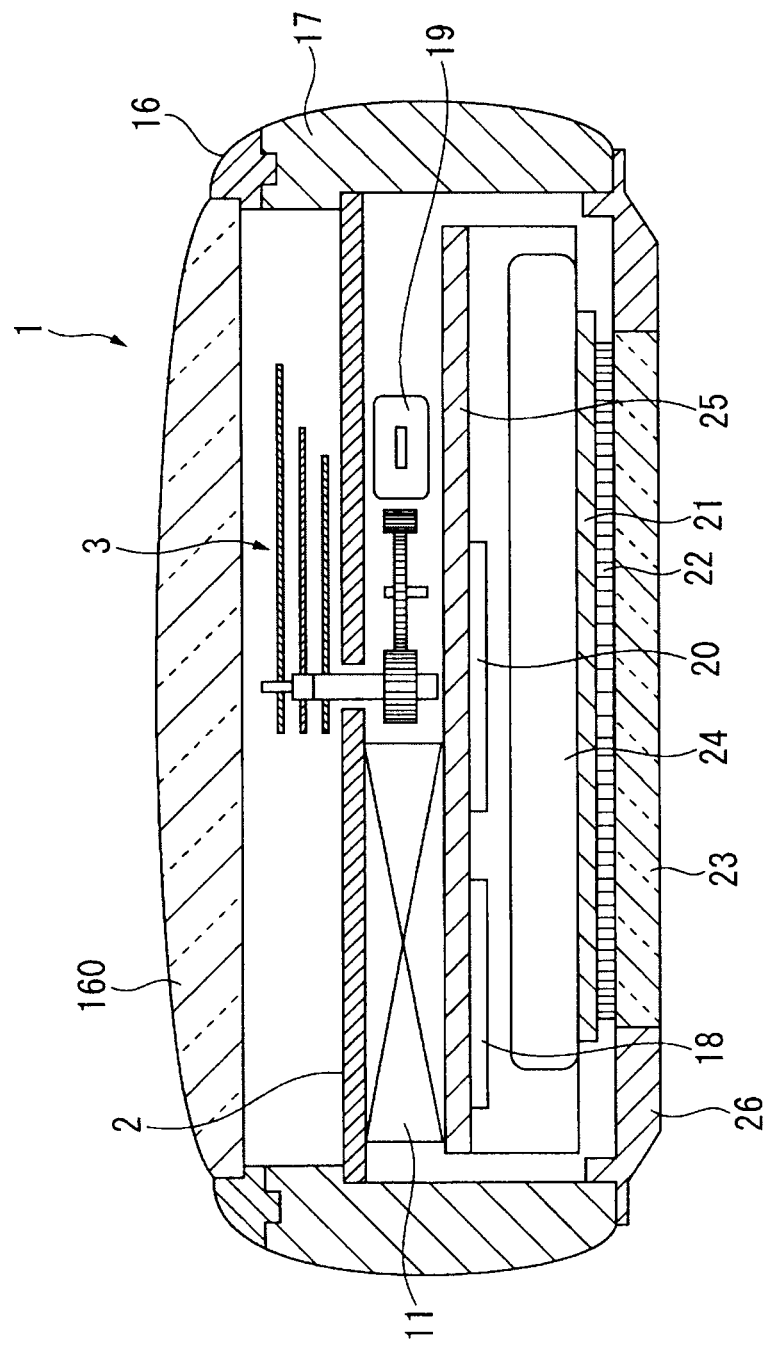
FIG. 3 schematic section view of the wristwatch with a GPS time adjustment device shown in FIG. 1.
Figure 4:
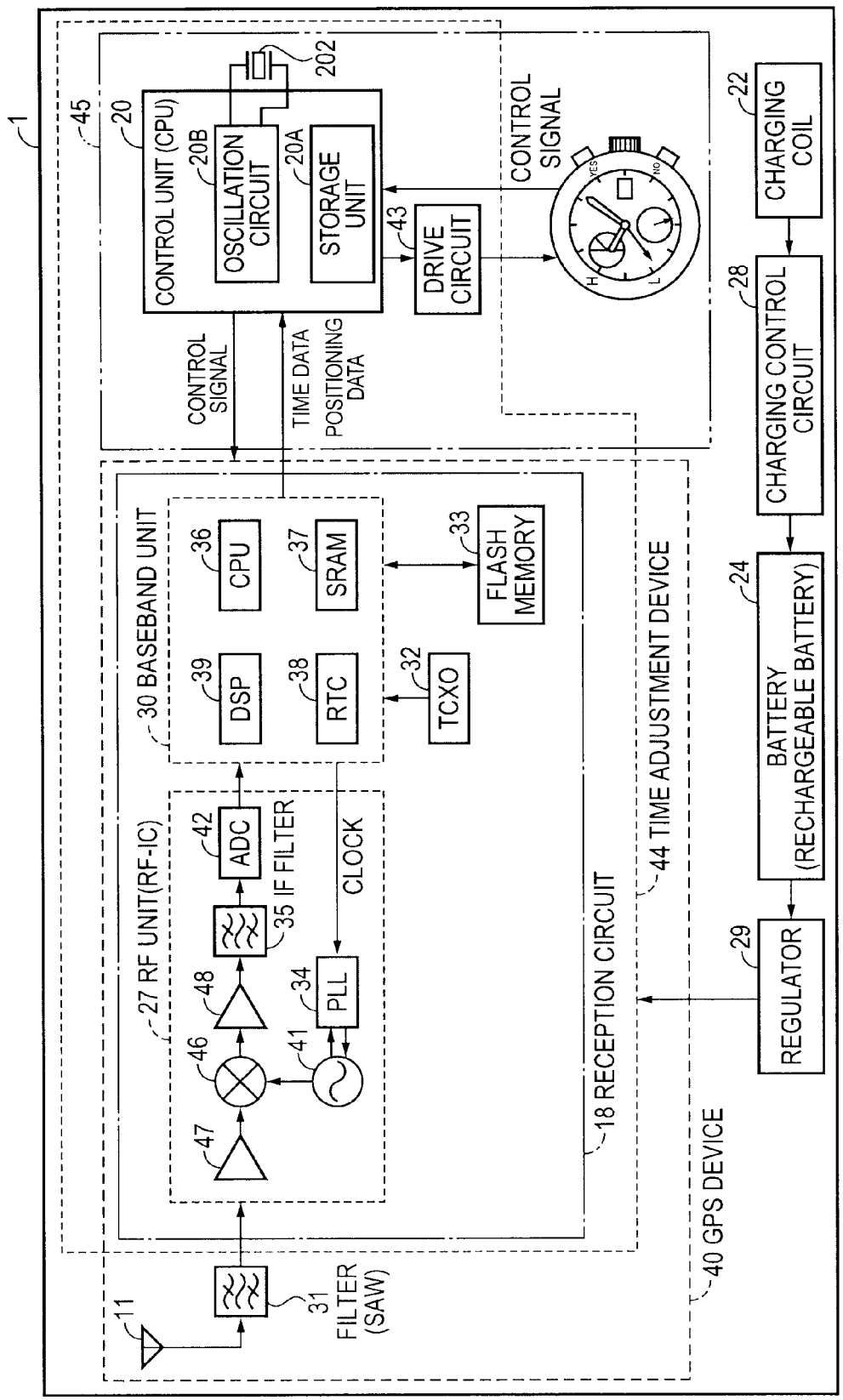
FIG. 4 is a block diagram showing the main internal hardware configuration of the wristwatch with a GPS time adjustment device shown in FIG. 1.

FIG. 1 is a schematic diagram showing a wristwatch with a GPS time adjustment device 1 (referred to below as a GPS wristwatch 1) as an example of a timepiece with a time adjustment device according to the present invention. FIG. 2 shows the face of the GPS wristwatch 1 shown in FIG. 1. FIG. 3 is a schematic section view of the GPS wristwatch 1, and FIG. 4 is a schematic block diagram showing the main hardware configuration of the GPS wristwatch 1.

As shown in FIG. 2, the GPS wristwatch 1 has a time display unit including a dial 2 and hands 3. The hands 3 include an hour hand 131, a minute hand 132, and a second hand 133.

Markers for indicating the time using the hands 3 on an analog timepiece are disposed to the dial 2.

Markers for displaying the reception condition and the reception result using the second hand 133 as further described below are also disposed to the dial 2. In this embodiment of the invention a "Y" is disposed at the 10-second marker, an "N" is disposed at the 20-second marker, an "L" is disposed at the 40-second marker, and an "H" is disposed at the 50-second marker. Note that Y is an abbreviation for "Yes", N is an abbreviation for "No", L is an abbreviation for "Low", and H is an abbreviation for "High" in this embodiment of the invention.

The reception state display device for displaying the satellite signal reception condition is thus rendered by the second hand 133 and dial 2 in this embodiment of the invention.

Two subdials 4 and 5 are also disposed to the time display unit. The first subdial 4 is disposed in the direction of 10:00 on the dial 2 relative to the center pin of the hands 3. The second subdial 5 is disposed in the direction of 6:00 on the dial 2 relative to the center pin of the hands 3.

A button A 6, a button B 7, and a crown 8 are disposed to the GPS wristwatch 1 as external operating members.

The first subdial 4 has a first hand 141 and a first dial 142 with a scale and markings pointed to by the first hand 141.

The second subdial 5 has a second hand 151 and a second dial 152 with a scale and markings pointed to by the second hand 151.

The first dial 142 is divided into two parts, a first area 143 and a second area 144. More specifically, the first dial 142 is round and is divided into two halves at a vertical line passing through the center, or more particularly is divided at a line passing through the 0:00 and 6:00 positions of the dial 2 into a 3 o'clock side of the dial 2 (the right side of the first dial 142) and a 9:00 o'clock side of the dial 2 (the left side of the first dial 142).

The first area 143 is rendered on the right side (the 3:00 o'clock side of the dial 2) of the first dial 142, and has a scale for indicating the day of the week. In this embodiment of the invention as shown in FIG. 2, markers for "M" denoting Monday, "T" denoting Tuesday, "W" denoting Wednesday, "T" denoting Thursday, "F" denoting Friday, "S" denoting Saturday, and "S" denoting Sunday are formed in the first area 143 counterclockwise from the bottom. Note that the "S" for Saturday is blue and the "S" for Sunday is red to making determining the day of week easier.

The second area 144 is rendered on the left side (the 9:00 o'clock side of the dial 2) of the first dial 142, and has a scale for indicating the latitude. In this embodiment of the invention the marker for 0° latitude is disposed at the 9:00 o'clock position of the first dial 142, a scale for indicating 0° to 90° north latitude is disposed clockwise from the 0° position to the 12:00 o'clock position (the boundary between the first area 143 and second area 144) of the first dial 142, and a scale for indicating 0° to 90° south latitude is disposed counterclockwise from the 0° position to the 6:00 o'clock position (the boundary between the first area 143 and second area 144) of the first dial 142.

A round scale 153 is formed on the second dial 152. This scale 153 is used both as a 24-hour hand scale and as a longitude scale. More specifically, markers for denoting the longitude are formed around the outside of the scale 153, and markers for denoting the hour in 24-hour time are disposed on the inside of the scale.

The longitude scale starts with 0° longitude at the 12:00 o'clock position of the second dial 152 (the top in FIG. 2), shows the scale for 0°-180° west longitude clockwise from the 12:00 o'clock position through the 3:00 o'clock and to the 6:00 o'clock position of the second dial 152, and shows the scale for 0°-180° east longitude counterclockwise from the 12:00 o'clock position through the 9:00 o'clock and to the 6:00 o'clock position of the second dial 152.

The 24-hour scale starts with 0:00 (24:00) at the 12:00 o'clock position of the second dial 152, and has markers for 1 to 23 clockwise around the second dial 152.

As further described below, the subdials 4 and 5 are switched between a time display mode and a position display mode by the subdial display controller 54.

When set to the time display mode, the first hand 141 of the first subdial 4 moves to the position in the first area 143 indicating the weekday of the internal time information. The second hand 151 of the second subdial 5 moves to the position indicating the hour of the internal time information using the scale 153 as a 24-hour scale.

When set to the position display mode, the first hand 141 of the first subdial 4 moves in the second area 144 to the position indicating the latitude of the acquired current positioning information, and the second hand 151 of the second subdial 5 moves to the position indicating the longitude of the acquired current positioning information.

The hands 3 include an hour hand 131, a minute hand 132, and a second hand 133, and are driven through a wheel train using a stepping motor (mechanical drive unit) described below.

The first hand 141 and second hand 151 are driven through wheel trains by separate stepping motors.

The GPS wristwatch 1 is configured to receive satellite signals from a plurality of GPS satellites 15 orbiting the Earth on predetermined orbits to acquire the satellite time information, and correct the internal time information based on the acquired satellite time information.

Note that GPS satellites 15 are simply an example of a positioning information satellite in the present invention, and a plurality of GPS satellites 15 are orbiting the Earth. At present there are approximately 30 GPS satellites 15 in orbit.

Internal Configuration of the GPS Wristwatch

The internal configuration of the GPS wristwatch 1 is described next.

As shown in FIG. 3, the GPS wristwatch 1 has an outside case 17 that is made of stainless steel, titanium, or other metal.

The outside case 17 is basically cylindrically shaped, and a crystal 160 is attached to the opening on the face side of the outside case 17 by an intervening bezel 16. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 3, a stepping motor for driving the first hand 141, a stepping motor for driving the second hand 151, a GPS antenna 11, and a battery 24.

The stepping motor is a common device widely used in timepieces, and has a motor coil 19 and a stator and rotor not shown. The stepping motor drives the hands 3 using an intervening wheel train. The stepping motors that drive the first hand 141 and second hand 151 are also not shown but are likewise common devices and drive the hands 141, 151 through respective wheel trains.

This GPS antenna 11 is a patch antenna for receiving satellite signals from a plurality of GPS satellites 15 orbiting the Earth on fixed orbits in space. The GPS antenna 11 is located on the opposite side of the dial 2 as the side on which the time is displayed, and receives RF signals through the crystal 160 and the dial 2.

The dial 2 and crystal 160 are therefore made from materials that pass RF signals, particularly the satellite signals transmitted from the GPS satellites 15. The dial 2, for example is plastic. The bezel 16 is ceramic in order to improve satellite signal reception.

The plane position of the GPS antenna 11 (the position in line with the surface of the dial 2) is as shown in FIG. 2 towards the 6:00 o'clock of the dial 2 relative to the rotational axis of the hands 3. The GPS antenna 11 is also located so that when the second hand 133 moves to the 0, 10, 20, 40, or 50 second position to indicate the reception level during reception, the second hand 133 will not be positioned over the GPS antenna 11. More specifically, the size and location of the GPS antenna 11, and the positions to which the second hand 133 points to indicate the reception level, are set so that the second hand 133 does not affect reception by the GPS antenna 11 when indicating the reception level.

A circuit board 25 is disposed on the back cover side of the GPS antenna 11, and a battery 24 is disposed on the back cover side of the circuit board 25.

The circuit board 25 is also populated with various circuit devices (such as IC devices) including a reception circuit 18 that processes signals received by the GPS antenna 11 as described below, and a control unit 20 that controls, for example, the stepping motor that drives the hands 3. The reception circuit 18 and the control unit 20 operate using power supplied from the battery 24.

The battery 24 is a lithium-ion battery or other type of storage battery. A magnetic sheet 21 is disposed below (on the back cover side of) the battery 24, and a charging coil 22 is disposed with the magnetic sheet 21 between it and the battery 24. The battery 24 can therefore be charged by the charging coil 22 using electromagnetic induction from an external charger. The magnetic sheet 21 can also divert the magnetic field. The magnetic sheet 21 therefore reduces the effect of the battery 24 and enables the efficient transmission of energy. The back glass unit 23 is disposed in the center part of the back cover 26 to facilitate power transmission.

The GPS wristwatch 1 is arranged as described above.

Circuit Design of the GPS Wristwatch

The circuit design of the GPS wristwatch 1 is described next.

As shown in FIG. 4, the GPS wristwatch 1 also has a time display device 45, a GPS device 40, and a time adjustment device 44, and functions as a computer. As shown in FIG. 4, the time display device 45, the GPS device 40, and the time adjustment device 44 share some parts.

The configuration shown in FIG. 3 is further described below.

GPS Device

As shown in FIG. 4, the GPS wristwatch 1 has a GPS device 40 that receives and processes satellite signals received from a GPS satellite 15.

The GPS device 40 includes the GPS antenna 11, a filter (SAW) 31, and the reception circuit 18. The filter (SAW) 31 is a bandpass filter and in this embodiment of the invention extracts a 1.5-GHz satellite signal. The GPS device 40 thus renders the reception unit of the present invention.

The reception circuit 18 processes the satellite signal extracted by the filter, and includes an RF (radio frequency) unit 27 and baseband unit 30.

The RF unit 27 includes a PLL 34, IF filter 35, VCO (voltage controlled oscillator) 41, A/D converter 42, mixer 46, low noise amplifier 47, and IF amplifier 48.

The extracted satellite signal is amplified by the low noise amplifier 47, mixed by the mixer 46 with the signal from the VCO 41, and down-converted to an IF (intermediate frequency) signal.

The If signal mixed by the mixer 46 passes the IF amplifier 48 and IF filter 35, and is converted to a digital signal by the A/D converter 42.

The baseband unit 30 also includes a digital signal processor (DSP) 39, a CPU (central processing unit) 36, SRAM (static random access memory) 37, and a real-time clock (RTC) 38. A temperature-compensated crystal oscillator (TCXO) 32 and flash memory 33 are also connected to the baseband unit 30.

The baseband unit 30 then processes the digital signal input from the A/D converter 42 of the RF unit 27 based on a control signal, and processes the satellite signal to acquire the satellite time information and positioning information.

The clock signal of the PLL 34 is generated by the temperature-compensated crystal oscillator (TCXO) 32.

The real-time clock 38 generates time information on the receiver side for processing satellite signals. The real-time clock 38 counts up at the reference clock output from the TCXO 32.

Time Adjustment Device

The time adjustment device 44 includes the reception circuit 18, the control unit 20, and a drive circuit 43. This time adjustment device 44 renders the time information adjustment unit of the invention.

The control unit 20 includes a storage unit 20A and an oscillation circuit 20B, and controls the GPS device 40, controls driving the hands 3 using the drive circuit 43. More specifically, the control unit 20 sends a control signal to the reception circuit 18, and controls the reception operation of the GPS device 40.

The storage unit 20A stores the time data (satellite time information) and positioning data acquired by the baseband unit 30 of the reception circuit 18, and stores the reception result in each reception mode.

Time Display Device

The time display device 45 includes the control unit 20, the storage unit 20A, the oscillation circuit 20B, a crystal oscillator 202, the drive circuit 43, the hands 3, and hands 141 and 151.

The control unit 20 controls counting up the time data (internal time information) stored in the storage unit 20A at a 1-Hz reference signal simultaneously to displaying the time with the hands 3. The 1-Hz reference signal is generated by the oscillation circuit 20B frequency dividing the oscillation frequency of the crystal oscillator 202.

When the satellite time information acquired by the baseband unit 30 is stored in the storage unit 20A and the internal time information is updated, the control unit 20 calculates the difference between the current time indicated by the hands 3 and the corrected internal time information, drives the stepping motor using the drive circuit 43 to drive the hands 3 equally to this time difference, and thereby controls the time indicated after the hands 3 are adjusted.

The GPS wristwatch 1 according to this embodiment of the invention is driven by power supplied from a rechargeable storage battery 24.

More specifically, the charging coil 22 charges the storage battery 24 with power through the charging control circuit 28. The storage battery 24 supplies drive power to the time adjustment device 44, for example, through the regulator 29.

As described above, the timekeeping mechanism in this embodiment of the invention is an electronic timepiece.

System Design of the Satellite Signal Reception Device

Figure 5:
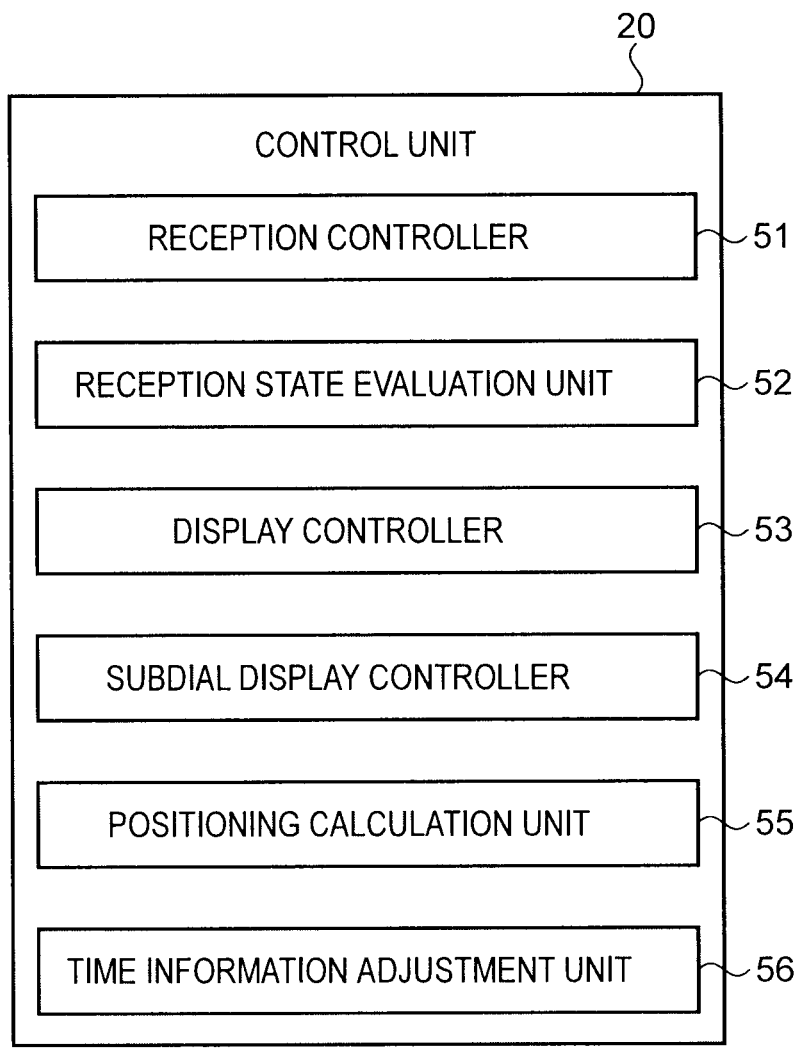
FIG. 5 is a block diagram showing the configuration of the control unit in a preferred embodiment of the invention.

FIG. 5 is a block diagram showing the system design of the satellite signal reception device according to the invention.

More specifically, the control unit 20 includes a reception controller 51, a reception state evaluation unit 52, a display controller 53, a subdial display controller 54, a positioning calculation unit 55, and a time information adjustment unit 56.

As described above, the reception controller 51 controls the reception process using the GPS device 40. The reception state evaluation unit 52 executes a process that determines the reception level. The display controller 53 controls displaying the reception level. The subdial display controller 54 controls displaying information on the subdials 4 and 5, and more particularly controls driving the hands 141 and 151. The positioning calculation unit 55 executes a process for getting orbit information from the received satellite signal and calculating the current position of the GPS wristwatch 1. The time information adjustment unit 56 executes a process for getting time information from the received satellite signal and adjusting the time of the GPS wristwatch 1.

The content of the processes executed by each of these units is described in detail while describing the reception process below.

The reception operation of the GPS wristwatch 1 is described next. The reception controller 51 enables selecting either a positioning mode or a time adjustment mode as the reception mode. More particularly, the reception controller 51 selects the time adjustment mode during the automatic reception process that executes automatically at a predetermined time, and selects either the positioning mode or the time adjustment mode when reception is manually initiated by the user operating a button according to the display mode to which the subdials are set when a button is operated.

Figure 6A:
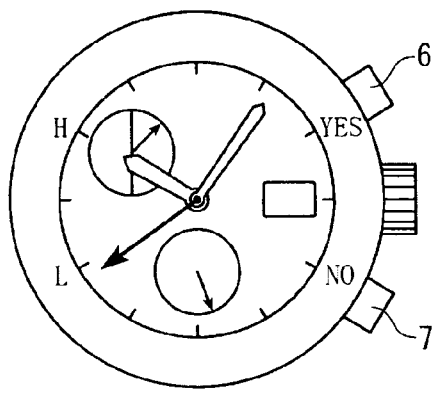
FIGS. 6A, 6B, and 6C illustrate changing the operating mode by operating the buttons and displaying the change in the reception mode in a preferred embodiment of the invention.
Figure 6B:
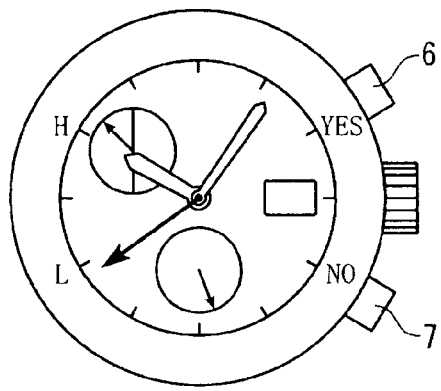

The display mode of the subdials is switched by pressing button B 7 in this embodiment of the invention. More specifically, as shown in FIG. 6, when the user presses button B 7, the subdial display controller 54 changes the displays of the subdials 4 and 5 between the time display mode shown in FIG. 6A and the position display mode shown in FIG. 6B. The display mode changes each time the button B 7 is pressed.

When the time display mode shown in FIG. 6A is selected and the button A 6 is operated in a predetermined way, such as being pressed continuously for 3 seconds or more, the reception controller 51 executes the reception process in the time adjustment mode. When the position display mode is selected as shown in FIG. 6B and button A 6 is pressed continuously for 3 seconds or more, the reception controller 51 runs the reception process in the positioning mode.

Each of these modes is described below.

Reception in the Positioning Mode

Figure 7:
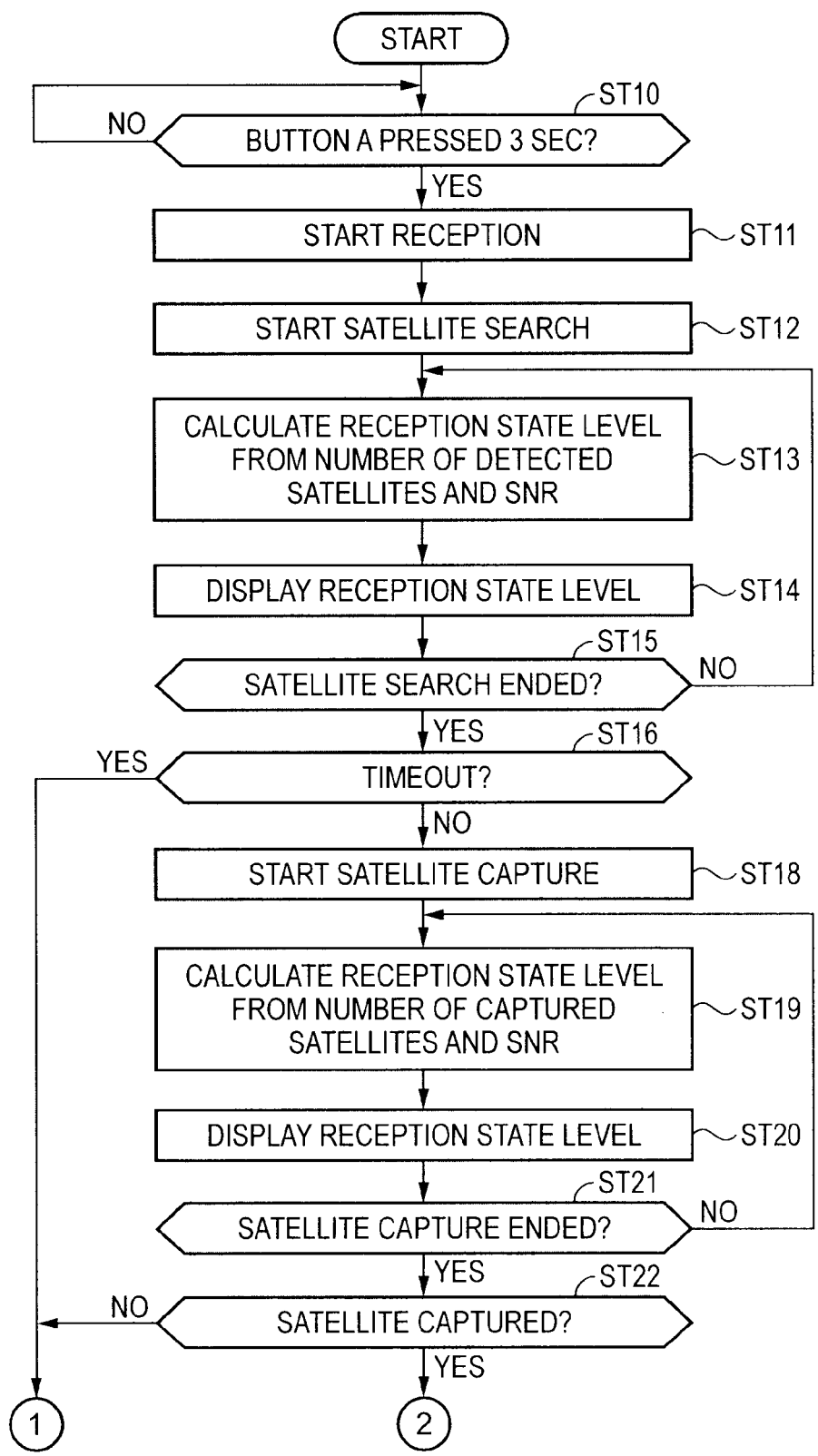
FIG. 7 is a flow chart showing the reception process in the positioning mode in a preferred embodiment of the invention.

The reception process executed when the positioning mode is selected is described next with reference to the flow chart in FIG. 7.

When the position display mode is selected as shown in FIG. 6B, the reception controller 51 determines if button A 6 (SWA) was depressed for 3 seconds or more (ST10).

If the reception controller 51 determines that the button A 6 was pressed for 3 seconds or more, it activates the GPS device 40 and starts reception (ST11). More particularly, the reception controller 51 activates the GPS device 40 and prepares for a GPS satellite 15 search.

In order to receive the GPS signals that are the satellite signals transmitted from the GPS satellites 15 through the GPS antenna 11, the GPS device 40 generates the C/A code (coarse/acquisition code) of the GPS satellite 15 as described below and starts reception.

Figure 6C:
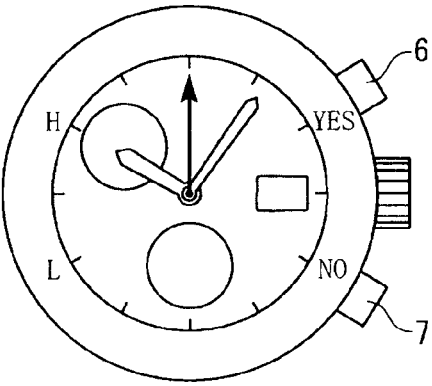

The reception controller 51 also moves the second hand 133 to the 0-second position using the display controller 53 as shown in FIG. 6C. This makes it obvious to the user that the GPS wristwatch 1 has entered the reception mode.

The reception controller 51 then starts the satellite search process (satellite search step) ST12. In the satellite search step ST12 the reception controller 51 searches sequentially for the GPS satellites using the procedure described below to receive the satellite signals and determine the SNR of each received signal.

More specifically, the reception controller 51 first searches sequentially from satellite number SV 1 to 30 in the satellite search step ST12 to find the GPS satellite 15 corresponding to each satellite number SV and detect the signal (SNR). More particularly, the reception controller 51 adjusts the output timing of the C/A code of the GPS satellite 15 and searches for a GPS satellite 15 with which it can synchronize.

Satellite signals from all of the GPS satellites 15 are transmitted on the same frequency, but are transmitted using code division multiple access (CDMA) by using a different C/A code for each GPS satellite 15. The GPS satellites 15 that can currently be captured (with which the reception unit can synchronize) can therefore be determined by reading the C/A code contained in the received satellite signal.

The reception controller 51 therefore adjusts the output timing of the C/A code pattern of each GPS satellite 15 to search for a GPS satellite 15 with which it can synchronize. That is, by detecting the correlation between the received satellite signal and the C/A code generated by the reception controller 51, the output will have an output peak at a predetermined time if the C/A codes are the same, but the output will not have a peak and be substantially flat at zero if the C/A codes differ.

The signal level of the satellite signal can also be acquired by determining the SNR of the synchronized satellite signal.

The reception controller 51 then stores information (such as the satellite number SV) about the GPS satellite 15 located by searching and the signal level of the detected satellite in SRAM 37 or other storage unit.

Note that the length of the C/A code is 1 ms, and a search for all approximately 30 GPS satellites 15 can be conducted in approximately 2 seconds by adjusting the C/A code output time while searching.

While the satellite search step ST12 starts and executes, the reception state evaluation unit 52 determines the number of GPS satellites 15 that were found by the search, gets the SNR of each GPS satellite 15, and executes a reception level calculation process ST13. This reception level calculation process ST13 executes at a predetermined interval (such as 1 second) until the satellite search ends.

In this embodiment of the invention the reception state evaluation unit 52 breaks the reception condition into three levels as defined in Table 1 and Table 2 below.

Table 1 shows the conditions for determining the reception level in the positioning mode and the time adjustment mode. Table 2 shows what the number of satellites counted in Table 1 mean at different reception stages.

TABLE 1

| Level | Positioning mode | Time adjustment mode | Condition |
| --- | --- | --- | --- |
| 0 | No. satellites < 4 | No. satellites = 0 | Reception not possible |
| 1 | No. satellites ≥ 4, satellites with SNR ≥ 40 is < 4 | No. satellites ≥ 1, satellites with SNR ≥ 40 is 0 | Weak signal but reception possible |
| 2 | Satellites with SNR ≥ 40 is ≥ 4 | Satellites with SNR ≥ 40 is ≥ 1 | Reliable reception possible |

TABLE 2

| Reception stage | Positioning mode | Time adjustment mode |
| --- | --- | --- |
| Satellite search | No. satellites found | No. satellites present |
| Satellite capture | No. satellites captured | No. satellites captured |
| Z count acquisition | No. satellites from which Z count acquired | No. satellites from which Z count acquired |
| Ephemeris acquisition | No. satellites from which ephemeris acquired | Not applicable |

More specifically, as shown in Table 1, when the positioning mode is selected, the reception state evaluation unit 52 determines the reception level is "0" when the number of GPS satellites 15 satisfying a predetermined condition is less than 4, determines the reception level is "1" when the number of GPS satellites 15 is 4 or more and the number of GPS satellites 15 from which the signal is received with an SNR greater than or equal to a predetermined level (40 in this embodiment of the invention) is less than 4, and determines the reception level is "2" if 4 or more GPS satellites 15 with an SNR greater than or equal to a predetermined level (40 in this embodiment of the invention) are found. In this embodiment of the invention as shown in Table 1, the number of satellites received when in the positioning mode is set to 4 so that the current position can be determined with high precision.

A reception level of 0 indicates that reception is not possible because of the small number of GPS satellites 15 from which signals can be received. A reception level of 1 indicates that reception is possible although the signal is weak. A reception level of 2 indicates that the positioning information and the time information can be reliably received because strong signals can be received from the required number of satellites.

The user can thus easily and reliably determine the current reception condition by simply reading the reception level that is displayed.

As shown in Table 2, the GPS satellites 15 that are counted to satisfy the conditions in Table 1 differ according to the current stage of the reception process. More specifically, during the satellite search state the number of satellites 15 indicates the number of GPS satellites 15 that can be found. In the satellite capture stage, the number of satellites indicates the number of GPS satellites 15 that are captured. In the Z count acquisition stage (time information acquisition stage) the number indicates the number of GPS satellites 15 from which the Z count was acquired, and in the ephemeris acquisition stage (positioning information acquisition stage) indicates the number of GPS satellites 15 from which the ephemeris data is acquired.

In step ST13, therefore, the reception state evaluation unit 52 calculates the reception level by comparing the number of GPS satellites 15 found by the satellite search and the SNR of each satellite signal with the conditions shown in Table 1.

The display controller 53 moves the second hand 133 to the position corresponding to the reception level calculated in ST13 to display the reception level (ST14). This reception level display step ST14 is related to step ST13 and also repeats at the predetermined interval (such as 1 second in this embodiment of the invention) until the satellite search ends.

Figure 9C:
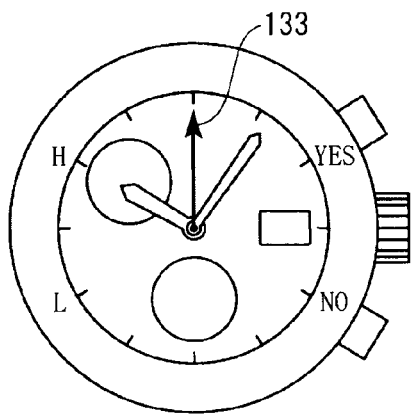
FIGS. 9C, 9D, 9E, and 9F illustrate displaying the reception level in a preferred embodiment of the invention.

More specifically, as shown in FIG. 9C, the display controller 53 moves the second hand 133 from the 0-second position to which it is moved when reception starts forward (clockwise) to the position corresponding to the calculated reception level.

Figure 9D:
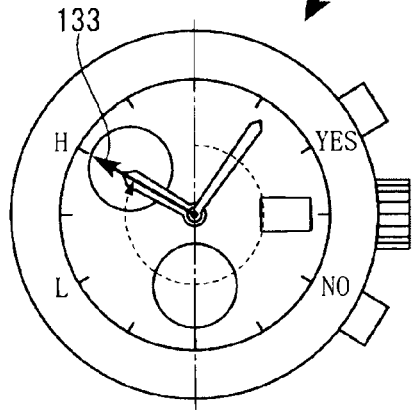

When the reception level is determined to be 2, the display controller 53 moves the second hand 133 forward (clockwise)

to the 50-second position where the H marker denoting a high reception signal level is disposed as shown in FIG. 9D.

Figure 9F:
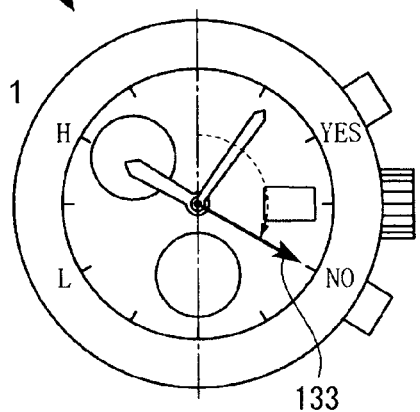
Figure 9E:
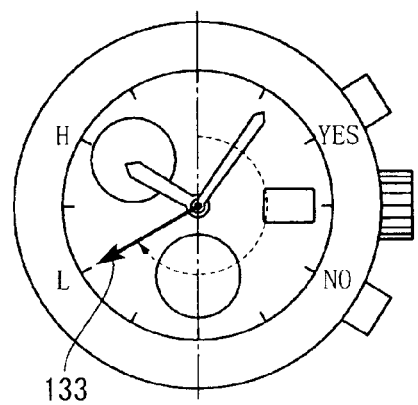

When the reception level is determined to be 1, the display controller 53 moves the second hand 133 forward (clockwise) to the 40-second position where the L marker denoting a low reception signal level is disposed as shown in FIG. 9E.

When the reception level is determined to be 0, the display controller 53 moves the second hand 133 forward (clockwise) to the 20-second position where the NO marker is disposed as shown in FIG. 9F.

Note that the second hand 133 is not limited to moving forward, and may be moved back (counterclockwise) to the appropriate position or moved in the direction having the movement angle.

The reception controller 51 then determines if all satellites have been searched for and whether the satellite search process has ended (ST15). For example, if the satellite search sequentially changes the satellite number SV from 1 to 30 while searching, the satellite search can be determined to have ended when the search for satellite number SV=30 ends.

If ST15 returns NO, that is, the satellite search process continues, the steps of calculating and displaying the reception level in ST13 and ST14 continue repeating at the predetermined interval of 1 second, for example. Note, however, that because the satellite search process is completed in approximately 2 seconds, steps ST13 and ST14 only execute once or twice.

The reception controller 51 then determines as a result of the GPS satellite 15 search if the time until the output timing of the C/A code for each located GPS satellite 15 can be adjusted and the signals synchronized is greater than or equal to a predetermined time (ST16). That is, the reception controller 51 determines if operation timed out.

More specifically, the reception controller 51 runs a terminate reception determination program that determines whether to stop reception to count the time passed since reception started, and determines whether operation timed out based on whether this time passed exceeds a predetermined time (such as 6 seconds).

More specifically, if a satellite can be detected, the GPS satellite 15 search process should be completed within a maximum 2 seconds. Therefore, if the receiver cannot synchronize with a GPS satellite 15 within a predetermined time after the satellite search step ST12 starts, which is 6 seconds in this embodiment, the reception controller 51 determines that reception timed out.

Figure 8:
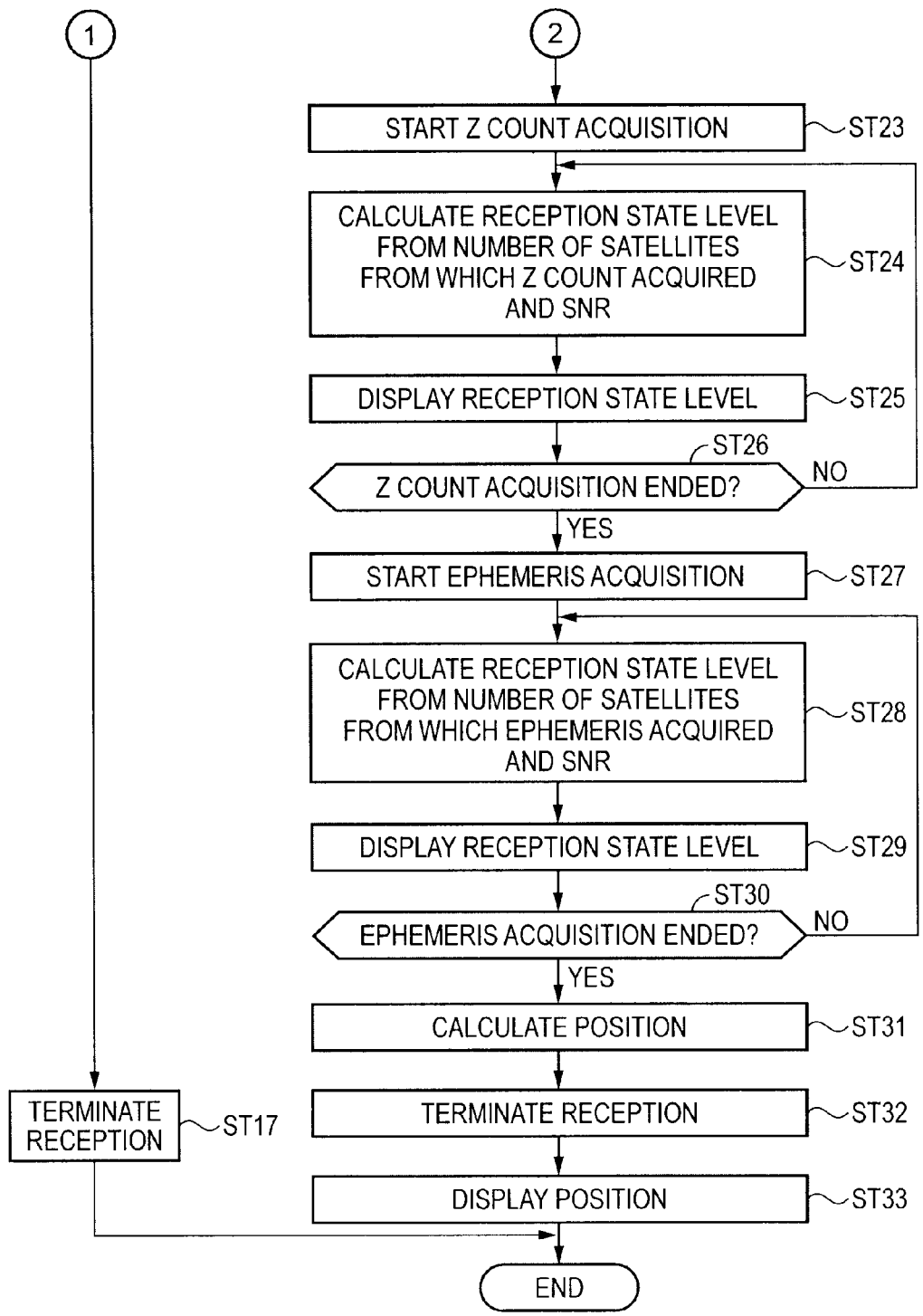
FIG. 8 is a continuation of the flow chart in FIG. 7.

If the reception controller 51 determines in ST16 that operation timed out, operation of the GPS device 40 is unconditionally terminated and reception ends as shown in FIG. 8 (ST17).

If the GPS wristwatch 1 is in an environment where reception is not possible, such as indoors, operation will time out because there is no GPS satellite 15 with which it can synchronize even after searching for all GPS satellite 15. Continuing to operate the GPS device 40 in this situation will simply waste power.

Therefore, if a GPS satellite 15 cannot be detected after the predetermined time passes, the GPS wristwatch 1 determines that operation timed out in ST16 and then terminates searching (reception) for the GPS satellites 15 in ST17. This reduces wasteful consumption of power.

However, if the reception controller 51 determines in step ST16 that operation did not time out, the reception controller 51 selects a detected GPS satellite 15 and starts the capture process for that GPS satellite 15 (ST18).

More specifically, the reception controller 51 executes a synchronization process using the C/A code for the selected GPS satellite 15. The reception controller 51 then determines if the satellite was captured based on whether or not the navigation message that is the satellite signal from the GPS satellite 15 could be decoded.

Based on the number of captured GPS satellites 15 and the respective SNRs, the reception state evaluation unit 52 then calculates the reception level in the satellite capture stage with reference to Table 1 and Table 2 (ST19).

The display controller 53 then moves the second hand 133 to display the reception level calculated in ST19 (ST20).

The reception controller 51 then determines if the satellite capture process ended (ST21). More specifically, the reception controller 51 determines if the satellite capture process ended based on whether the synchronization confirmation process has been applied to all GPS satellites 15 found in the satellite search step ST12.

The reception state evaluation unit 52 and display controller 53 continue executing steps ST19 and ST20 at a 1-second interval (predetermined interval) until the satellite capture process ends.

The reception controller 51 then determines if a satellite was captured (ST22), and terminates reception (ST17) if a satellite could not be captured.

If a GPS satellite 15 was captured, the reception controller 51 gets the navigation message from the satellite signal and more particularly begins acquiring the Z count (ST23).

The signal (satellite signal) transmitted by the GPS satellites 15, otherwise known as the navigation message, is described next.

Figures 10A, 10B:
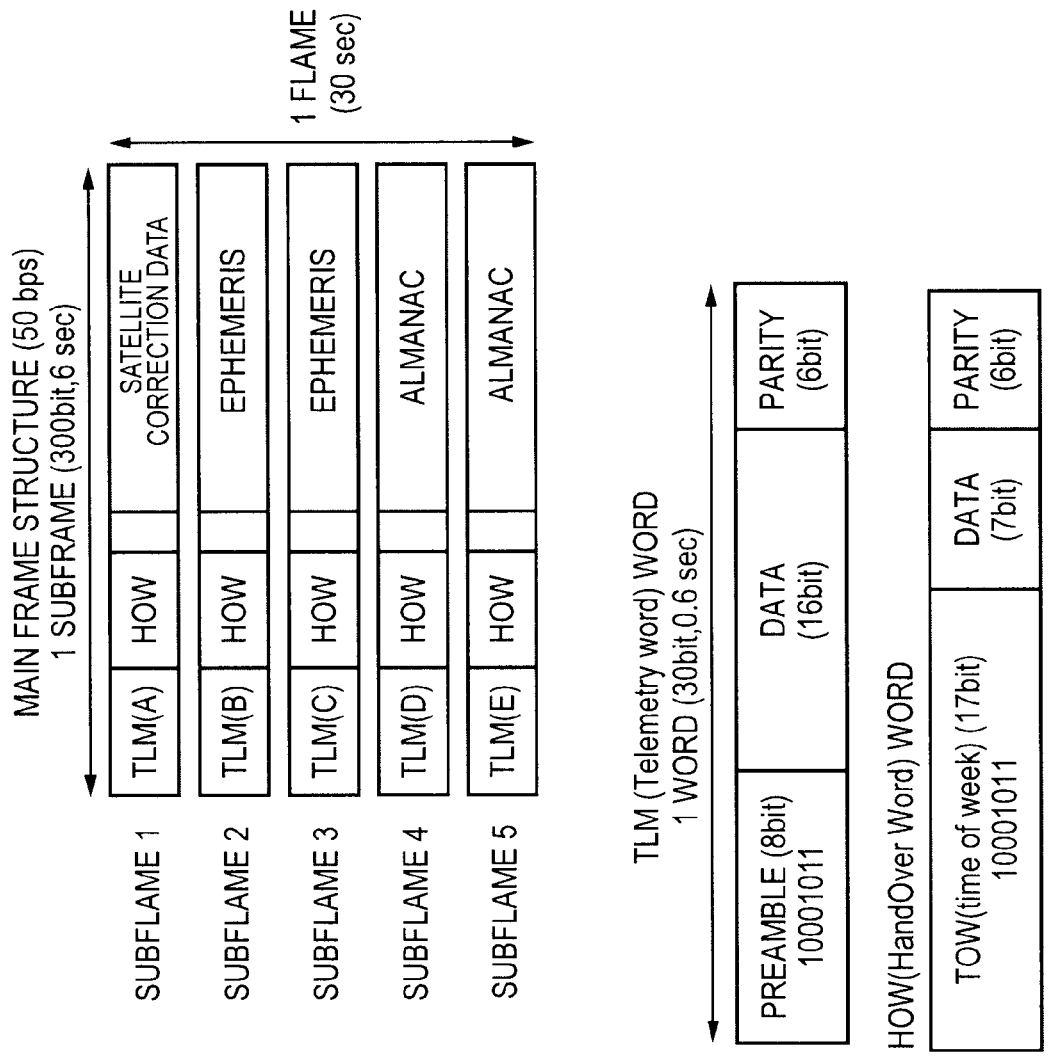
FIGS. 10A and 10B schematically illustrates the structure of the GPS satellite signal.

The structure of the GPS satellite signal is described schematically in FIG. 10A and FIG. 10B.

As shown in FIG. 10A, signals are transmitted from each of the GPS satellites 15 in units of one frame every 30 seconds. One frame contains five subframes. Each subframe is 6 seconds long, and contains 10 words (each word is 0.6 second).

The first word in each subframe is a telemetry (TLM) word storing the TLM data, and each TLM word starts with a preamble as shown in FIG. 10B.

The TLM word is followed by a handover word HOW storing the HOW (handover) data, and each HOW starts with the time of week (TOW) (also called the Z count) indicating the GPS time information of the GPS satellite.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. This GPS time is also called the Z count or the Z count data, and enables the GPS device 40 to know the current time.

The word data in subframe 1 shown in FIG. 10A includes satellite correction data. This satellite correction data includes a word (WORD3) storing calendar information, specifically the week number (WN), and satellite health information (SVhealth).

The week number is information identifying the week in which the current GPS time information is contained. More specifically, the starting point for the GPS time information is 00:00:00 of Jan. 6, 1980 referenced to the Coordinated Universal Time (UTC), and the week that started on that day is week 0. The GPS receiver can therefore get the precise GPS time from the week number and the elapsed time (number of seconds).

The week number is updated once a week.

Once the receiver gets the week number and counts the seconds passed since the week number was acquired, the current week number of the GPS satellite 15 can be known from the acquired week number and the elapsed time without getting the week number data again. As a result, the approximate current GPS time can be known once the Z count data is acquired. Power consumption can therefore normally be reduced because the reception operation of the receiver can be completed in a short time by acquiring only the Z count data.

If for some reason the acquired week number data is deleted, the count of the time passed from when the week number was acquired is off, or a predetermined time has passed since the week number data was acquired, the week number data can be acquired again from the satellite signal received from a GPS satellite 15, and the receiver can get the current GPS time from the newly received week number data and Z count data.

As shown in FIG. 10A, the main frame of the navigation message contained in the signal from the GPS satellite 15 contains 1500 bits and is transmitted at 50 bps.

The main frame is divided into five subframes of 300 bits each.

One frame is equivalent to 30 seconds. One subframe is therefore equivalent to 6 seconds. As described above, the TLM word and the Z count data (TOW) in the HOW word are contained in the first two words of each subframe. The Z count data starts from subframe 1, and six seconds of data is contained in each subframe. Subframe 1 to subframe 5 therefore contain the TLM word and the Z count (TOW) data in the HOW word. The Z count (TOW) data is therefore the time information for the next subframe. For example, the Z count data in subframe 1 is the time data for subframe 2.

As shown in FIG. 10, the navigation message carried in the satellite signal from the GPS satellite 15 includes the preamble data and the TOW in the HOW word, and the subframe data, including the ephemeris (detailed orbit information for the transmitting GPS satellite 15), almanac (orbit information for all GPS satellites 15), and the UTC data. More specifically, the subframe data of the navigation message is carried in subframe 1 to subframe 5, and the data in these five subframes render one frame data unit. The subframe data is divided into words 1 to 10.

Therefore, while the HOW word or Z count is transmitted every 6 seconds, the week number (WN) and ephemeris are transmitted every 30 seconds.

Because the signals described above are transmitted from the GPS satellites 15, GPS signal reception as used herein indicates phase synchronization with the C/A code from the GPS satellite 15.

More specifically, the GPS device 40 that is the receiver must synchronize with the signal from the GPS satellite 15 in order to get the frame data from a particular GPS satellite 15.

The C/A code is used for synchronization with 1 ms precision, and is a 1023-chip pseudo random noise code that repeats every 1 ms. The C/A code (1023 chip (1 ms) code) is different for each of the plural GPS satellites 15, and is unique to a particular satellite.

Therefore, to receive the satellite signal from a particular GPS satellite 15, the GPS device 40 (reception unit) generates the unique C/A code for a particular GPS satellite 15 and phase synchronizes with the C/A code from the selected GPS satellite 15 to receive the satellite signal.

By synchronizing with the C/A code (1023 chips (1 ms)), the preamble of the TLM word and the HOW word of each subframe can be received, and the Z count data can be acquired from the HOW word. After acquiring the TLM word and the Z count (TOW) from the HOW word, the GPS device 40 can then acquire the week number (WN) data and the satellite health SVhealth data.

Whether the acquired Z count data can be trusted can be determined with a parity check. More specifically, the parity data following the TOW data in the HOW word can be used to verify if the received data is correct. If an error is detected from the parity data, there is something wrong with the Z count data and the Z count data is not used to correct the internal clock.

The frame data shown in FIG. 10 is thus an example of information carried in frame units, and the subframe data is an example of information carried in subframe units, and both are examples of a specific unit of the satellite signal. The Z count (TOW) data is an example of satellite time information from a positioning information satellite (GPS satellite 15). The week number (WN) data is an example of week number information, which is the number of weeks from the origin of the satellite time information. The Z count data, week number (WN) data, TLM word, and HOW word are examples of satellite signal information. The satellite health SVhealth data is an example of positioning information satellite health information describing the operating condition of the positioning information satellite.

The navigation message that is the satellite signal transmitted from the GPS satellite 15 is as described above.

When acquiring the Z count begins in ST23, the reception controller 51 phase synchronizes to the C/A code of the captured GPS satellite 15, and acquires the Z count from the HOW word (ST23).

The reception state evaluation unit 52 then calculates the reception level in the Z count acquisition stage based on the number of GPS satellites 15 from which the Z count was acquired and the SNR with reference to Table 1 and Table 2 (ST24).

The display controller 53 then moves the second hand 133 to display the reception level calculated in ST24 (ST25).

The reception controller 51 then determines if the Z count acquisition process ended (ST26).

The reception state evaluation unit 52 and display controller 53 continue executing steps ST25 and ST25 at a 1-second interval (predetermined interval) until the Z count acquisition process ends.

The reception controller 51 then acquires the ephemeris data for the GPS satellite 15 from which the Z count was acquired (ST27).

The reception state evaluation unit 52 then calculates the reception level in the ephemeris acquisition stage based on the number of GPS satellites 15 from which the ephemeris was acquired and the SNR with reference to Table 1 and Table 2 (ST28).

The display controller 53 then moves the second hand 133 to display the reception level calculated in ST28 (ST29).

The reception controller 51 then determines if the ephemeris acquisition process ended (ST30).

The reception state evaluation unit 52 and display controller 53 repeat steps ST28 and ST29 at a 1-second interval (predetermined interval) until the ephemeris acquisition process ends.

When the ephemeris acquisition process ends, the positioning calculation unit 55 executes the positioning calculation to determine its position based on the ephemeris data from at least four GPS satellites 15 (ST31).

More specifically, because at least four satellites are needed for precise positioning, ST30 determines the ephemeris data was acquired if the ephemeris data was acquired from at least four satellites, and the positioning calculation unit 55 then calculates the position using the data from four satellites.

If the GPS wristwatch 1 can operate on a plurality of channels, plural satellite signals can be received simultaneously. As a result, the satellite search step ST12, satellite capture step ST18, Z count acquisition step ST23, and ephemeris acquisition step ST27 can be extracted in parallel on each of the channels. Note that while the reception stage may differ on each of the channels, the reception state evaluation unit 52 and display controller 53 calculate and display the reception level of reception stage until the reception process is completed on at least four channels, that is, for at least four GPS satellites 15, in each reception stage. When reception is completed for four GPS satellites 15 and each of the reception channels proceeds to the next reception stage, the reception level is calculated and displayed for the next reception stage.

For example, if the GPS wristwatch 1 has five or more reception channels, satellite capture has ended and Z count acquisition has started for three satellites, but the satellite capture process continues on the other channels, the reception state evaluation unit 52 and display controller 53 continue calculating and displaying the reception level at the satellite capture stage. However, when the Z count is acquired on four channels, the reception state evaluation unit 52 and display controller 53 calculate and display the reception level for the Z count acquisition stage.

Therefore, the current position is calculated based on the ephemeris data from the first four captured satellites in the position calculation step ST31, but the ephemeris data acquired on a different reception channel while the position is being calculated may also be used in the positioning calculation.

The reception controller 51 ends the reception process when the positioning calculation ends (ST32).

The subdial display controller 54 then displays the result of the positioning calculation, or more particularly the acquired position (latitude and longitude in this example) (ST33). More specifically, the subdial display controller 54 moves the first hand 141 to the position indicating the calculated latitude in the second area 144 of the first dial 142, and moves the second hand 151 to the position indicating the calculated longitude in the second dial 152.

When this positioning result display step ST33 executes and when the reception termination step ST17 executes, the reception process in the positioning mode ends.

The reception controller 51 also stores the reception result in the positioning mode to the storage unit 20A. More specifically, the reception controller 51 stores information indicating that reception was successful when the positioning result display step ST33 executes, and stores information indicating that reception failed when the reception termination step ST17 executes.

Reception Process in the Time Adjustment Mode

Figure 11:
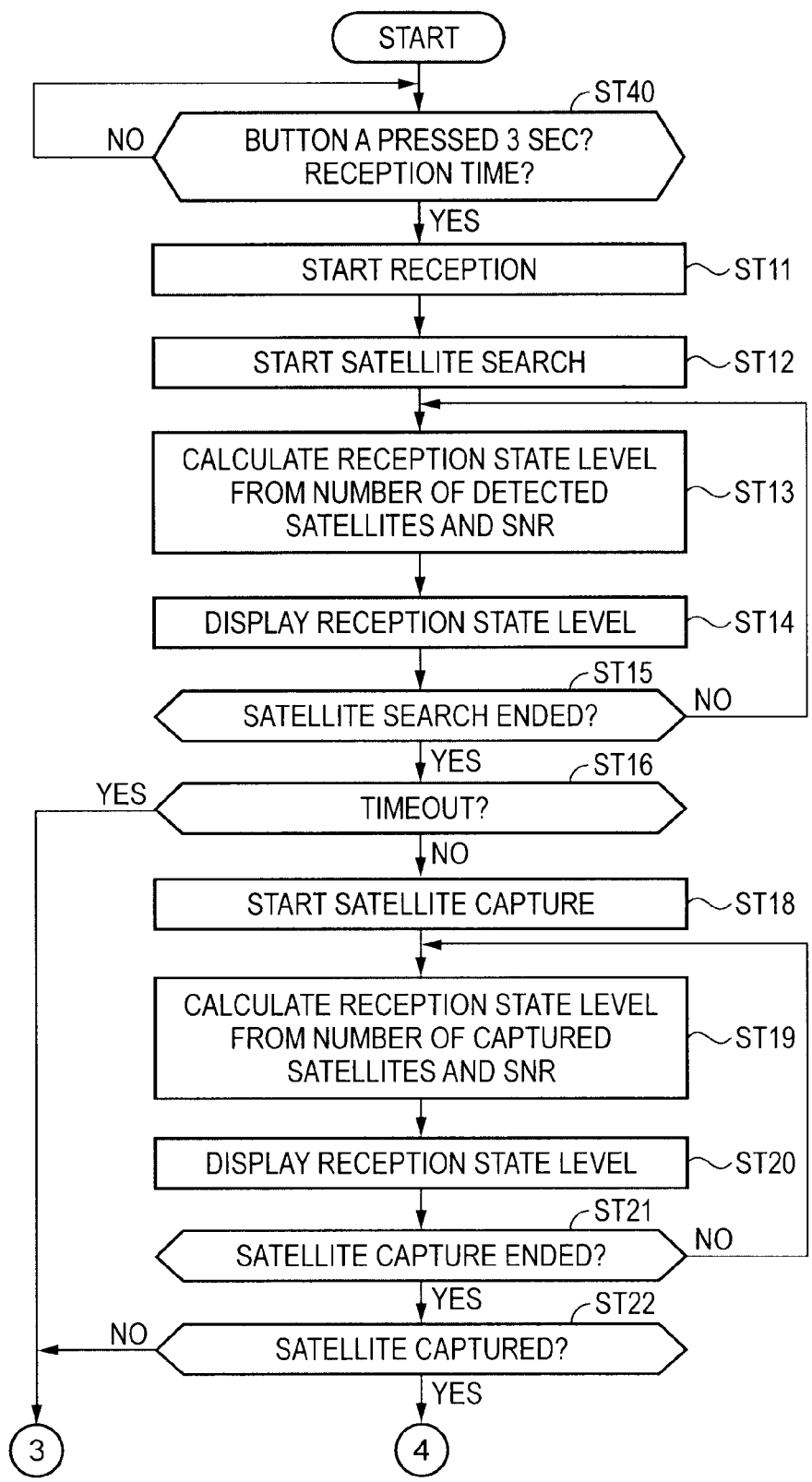
FIG. 11 is a flow chart describing the reception process in the time adjustment mode in a preferred embodiment of the invention.
Figure 12:
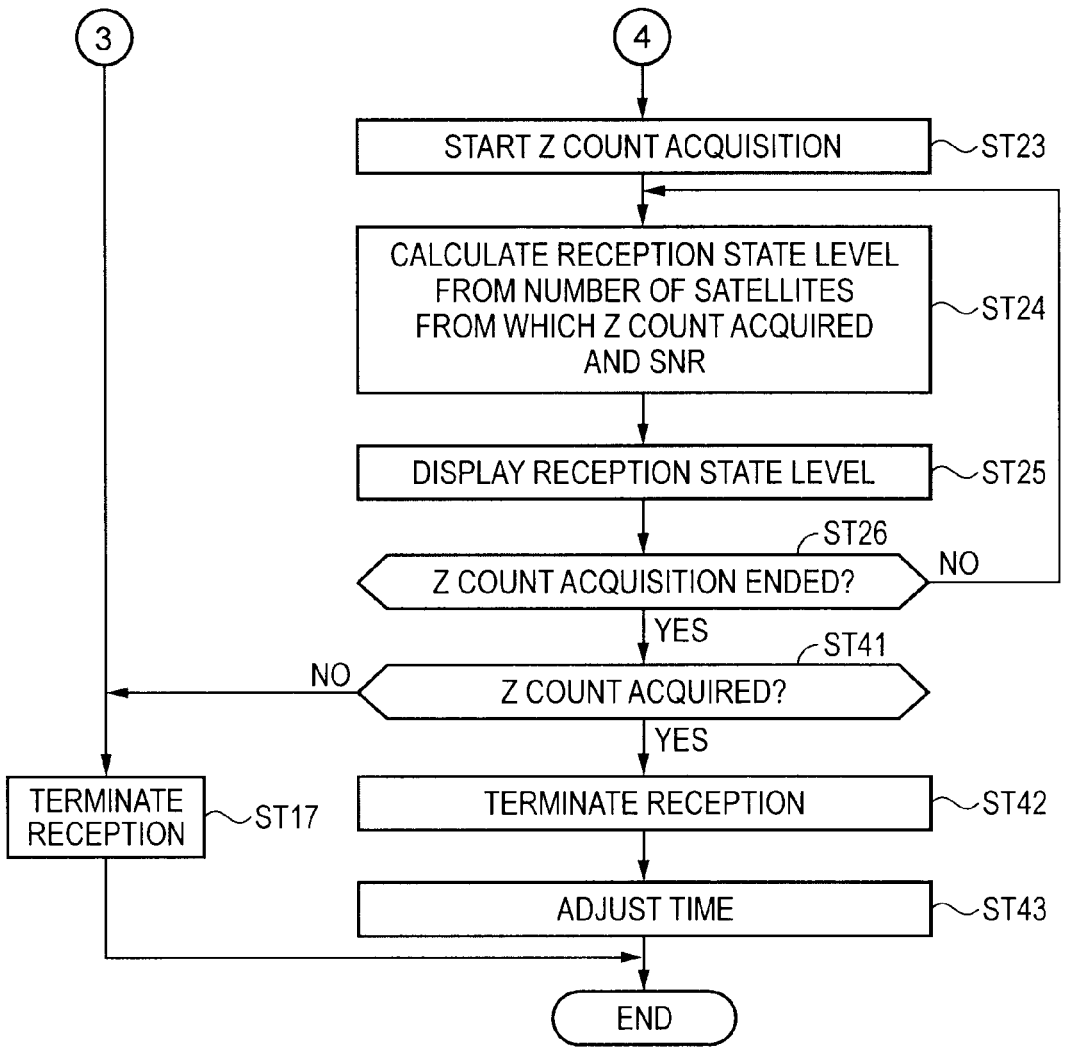
FIG. 12 is a continuation of the flow chart in FIG. 11.

The reception process in the time adjustment mode is described next with reference to the flow charts in FIG. 11 and FIG. 12. Note that steps that are the same as in the positioning mode reception process shown in FIG. 7 and FIG. 8 are identified by the same reference numerals and further description thereof is omitted below.

When the time display mode is selected as shown in FIG. 6A, the reception controller 51 determines if button A 6 (SWA) was depressed for 3 seconds or more, or if the internal time kept by the control unit 20 has reached the predetermined reception time (reception timing) (ST40).

The automatic reception time (time adjustment timing) is set referenced to a time such as described below. If the GPS wristwatch 1 is accurate to a maximum of approximately 0.5 second per day, the number of times per day that the satellite signal is received from the GPS satellite 15 to correct the time may be limited to 2 or 3 times per day. The GPS wristwatch 1 therefore preferably receives the satellite signal when it is in a good environment for receiving satellite signals from a GPS satellite 15. The reception time is therefore set to a time when the GPS wristwatch 1 is likely to be in an environment where reception is good.

The reception time is therefore set to a time such as 2:00 or 3:00 a.m., or 7:00 or 8:00 a.m.

Setting the reception time to 2:00 or 3:00 a.m. is effective because the likelihood is high that the GPS wristwatch 1 is not being used by the user and is removed from the wrist and left stationary indoors, electrical appliance use is minimal, and the signal reception environment is best.

Setting the reception time to 7:00 or 8:00 a.m. is also effective because this is the typical time for commuting to work or school, and the likelihood is high that the user is wearing the GPS wristwatch 1 and the GPS wristwatch 1 will be outdoors sometime during this period. More particularly, even if the user is inside a building or factory where satellite signal reception is poor while at work, the user is likely outdoors while commuting, and the likelihood is therefore greater that the signal reception environment is good and the satellite signal can be received.

Because reception is also started by the user manually pressing the button A 6 for 3 seconds or more, the reception controller 51 also determines if the button A 6 is pressed for 3 seconds or more when the time display mode is selected by the subdial display controller 54.

If the reception time has arrived in ST10 or the button A 6 is pressed for 3 seconds or more, the reception controller 51 activates the GPS device 40 and executes reception starting step ST11 to start receiving satellite signals transmitted from the GPS satellites 15. This reception starting step ST11 is the same as described above during positioning information reception.

This embodiment of the invention is set to run the same process when reception is started manually by the user operating the button A 6 and when reception starts automatically at the preset reception time, but the operations of moving the second hand 133 to the 0-second position and calculating displaying the reception level during reception may be executed only when reception is triggered manually. This is because the user may not verify the reception condition when reception starts automatically.

The reception controller 51 then executes the satellite search step ST12 in the same way as in the positioning mode reception process described above, and while the satellite search process continues the reception state evaluation unit 52 and display controller 53 execute the steps for calculating and displaying the reception level at a predetermined interval (such as a 1-second interval) based on Table 1 and Table 2 (ST13, ST14).

Note that when the time adjustment mode is selected, the reception state evaluation unit 52 determines the reception level is "0" when the number of GPS satellites 15 satisfying a predetermined condition is 0, determines the reception level is "1" when the number of GPS satellites 15 satisfying the predetermined condition is 1 or more and there are no GPS satellites 15 from which the signal is received with an SNR greater than or equal to a predetermined level (40 in this embodiment of the invention), and determines the reception level is "2" if 1 or more GPS satellite 15 with an SNR greater than or equal to the predetermined level (40 in this embodiment) is found.

The threshold value for evaluating the SNR may be the same as in the positioning mode, or it may be a lower value than is used in the positioning mode, such as an SNR of 36. This is because less data is captured in the time adjustment mode than in the positioning mode, and the likelihood is high that reception is possible even if the reception signal level is slightly lower than in the positioning mode.

In this embodiment of the invention as shown in Table 1, the number of satellites received when in the time adjustment mode is set to 1 so that the time adjustment process can be executed with the smallest possible number of captured satellites.

Also note that as shown in Table 2, the GPS satellites 15 that are counted to satisfy the conditions in Table 1 differ according to the current stage of the reception process, but are the same as in the positioning mode except that there is no ephemeris acquisition stage in the time adjustment mode.

The reception controller 51 then determines if the satellite search process has ended (ST15). If it has ended, the reception controller 51 determines if operation timed out based on whether the time passed since the satellite search started exceeds a predetermined time (such as 6 seconds) (ST16).

If the reception controller 51 determines in ST16 that operation timed out, it unconditionally stops operation of the GPS device 40 and terminates reception (ST17).

However, if the reception controller 51 determines in step ST16 that operation did not time out, the reception controller 51 starts the satellite capture process (ST18). The reception state evaluation unit 52 and display controller 53 then calculate the reception level (ST19) and display the reception level (ST20) at the predetermined interval (1 second) until it is determined in ST21 that the satellite capture process ended.

When the reception controller 51 determines in ST21 that the satellite capture process ended, it confirms if a GPS satellite 15 was captured (ST22).

If it is determined in the satellite capture evaluation step ST22 that a satellite was not captured, reception ends (ST17).

If it is determined in the satellite capture evaluation step ST22 that a satellite was not captured, control may alternatively return to the satellite search step ST12 to repeat the GPS satellite 15 search.

More specifically, because the GPS wristwatch 1 according to this embodiment of the invention can simultaneously receive a plurality of satellite signals, the GPS wristwatch 1 can search simultaneously for a plurality of GPS satellites 15 in the satellite search step ST12, and if GPS satellites 15 can be found, the likelihood is high that at least one GPS satellite 15 can be captured.

However, if there is one reception channel, a GPS satellite 15 with a relatively low signal level may be found in the satellite search step ST12 before a GPS satellite 15 with a strong signal is found. In this situation it may be possible to find and capture a different GPS satellite 15 even when it is determined in the satellite capture evaluation step ST22 that the GPS satellite 15 could not be captured. Therefore, particularly when there is only one reception channel, it is preferable to return to the satellite search step ST12 and repeat the process from the satellite search step if it is determined in the satellite capture evaluation step ST22 that the GPS satellite 15 could not be captured.

However, if a GPS satellite 15 was captured, the reception controller 51 starts the Z count acquisition step (ST23) in the same way as in the positioning mode.

The reception state evaluation unit 52 and display controller 53 then continue to calculate and display the reception level at the predetermined interval (1 second, for example) (ST24 and ST25) until the Z count acquisition process is determined to have ended in ST26.

When the reception controller 51 determines in ST26 that the Z count acquisition process ended, it determines if the Z count was acquired (ST41).

Note that the reception controller 51 determines if the acquired Z count data (TOW) is reliable before determining if the Z count could be acquired. That is, if the reception controller 51 confirms an error in the Z count data using the parity check as described above, there is something wrong with the acquired Z count and the acquired Z count is not used to adjust the time. Therefore, if the reception controller 51 finds an error in the Z count data, it determines that the Z count data could not be acquired (ST41).

If it is determined in ST41 that the Z count could not be acquired, the reception controller 51 ends the reception process (ST17).

If it is determined in ST41 that the Z count was acquired, the reception controller 51 ends the reception process (ST42). The time information adjustment unit 56 then adjusts the internal time kept in the storage unit 20A based on the received Z count data (ST43).

Based on the corrected internal time information, the control unit 20 then controls moving the hands 3 on the dial 2 of the GPS wristwatch 1 to display the time and adjusts the second hand 151 to display the time in the 24-hour dial.

The GPS wristwatch 1 ends the reception process in the time adjustment mode when reception is terminated in ST17 and when the time has been adjusted in ST43.

The reception controller 51 also stores the reception result of the time adjustment mode to the storage unit 20A. More specifically, when the time adjustment step ST43 is executed, the reception controller 51 stores information indicating that reception was successful in the time adjustment mode, but if reception is aborted in the reception termination step ST17, the reception controller 51 stores information indicating that reception failed in the time adjustment mode.

Reception Result Display Mode

The normal display mode is restored when the reception process ends in both the positioning mode and the time adjustment mode.

When the button A 6 is pressed in the normal display mode, the mode displaying the last reception result is entered as shown in FIG. 13. More specifically, after executing the reception process in the positioning mode and the time adjustment mode, the reception controller 51 stores a result value in the storage unit 20A indicating whether reception succeeded or failed in each mode.

As a result, when the subdial display controller 54 is set to the time display mode as shown in FIG. 13A and the reception result display mode is then selected, the display controller 53 reads the reception result data for the time adjustment mode stored in the storage unit 20A. If reception was successful, it moves the second hand 133 to the YES position (the 10-second position) as shown in FIG. 13C, but if reception failed, it moves the second hand 133 to the NO position (the 20-second position) as shown in FIG. 13D.

When the subdial display controller 54 is set to the position display mode as shown in FIG. 13B and the reception result display mode is then selected, the display controller 53 reads the reception result data for the position display mode stored in the storage unit 20A. If reception was successful, it moves the second hand 133 to the YES position (the 10-second position), but if reception failed, it moves the second hand 133 to the NO position (the 20-second position).

When the reception result is displayed and the button A 6 is pressed once, the original normal display mode is resumed.

Note that the normal display mode may also be automatically resumed when a predetermined time, such as 5 seconds, passes after entering the reception result display mode.

The normal display mode is also resumed after the reception process ends in this embodiment of the invention, but operation may also be controlled to immediately go to the reception result display mode after the reception process ends.

The effects of this embodiment of the invention are described below.

(1) Because the reception level is displayed when satellite signals are received from a positioning information satellite, the user can be quickly informed of the reception conditions. The user can therefore quickly know if the reception level is low, and can thus take appropriate action to move to a location with a good reception environment to continue the reception process, for example. Wasteful power consumption resulting from failed reception can thus be reduced, and the duration time can be increased and user convenience improved in a small mobile satellite signal reception device such as a wristwatch.

(2) The reception level is displayed using only three levels, 0 to 2, is thus very simple, and enables everyday users to easily know the reception condition. More specifically, when numbers for a plurality of satellites and the corresponding reception level for each satellite are separately displayed as in the related art, the user must read all of the displayed information and determine the current reception condition, but it can be difficult for everyday users that do not understand how the GPS system works to correctly evaluate the reception condition.

The present invention, however, enables the user to easily know the current reception state because the reception level is displayed using only three levels, 0, 1, and 2. The user can therefore know to move to a location where the reception environment is good in order to continue reception if the reception level is a 0 or 1.

(3) The reception state evaluation unit 52 can appropriately determine the reception level at each stage of the reception process because the conditions for calculating the reception level are set according to the stage of progress in the reception process. In addition, because the reception state evaluation unit 52 and display controller 53 calculate and display the reception level at a 1-second interval during each reception stage, the change in the reception conditions can be displayed substantially in real time at each reception stage, and a location with good reception can therefore be detected relatively easily.

Furthermore, because the reception result can be displayed by pressing a button A 6 during normal operation, whether reception succeeded or failed can also be easily confirmed.

(4) A special mechanism or display for displaying the reception level is not needed because the reception level and reception result are displayed using the second hand 133. The parts count of the GPS wristwatch 1 and the cost can therefore be reduced, the timepiece design can be simplified, and the appearance can be improved.

(5) The GPS antenna 11 is disposed to a position where it is not overlapped by the second hand 133 when the second hand 133 is disposed to a position indicating the reception level. As a result, the second hand 133 will not affect reception by the GPS antenna 11 when the second hand 133 is stopped at a position indicating the reception level, and a drop in reception performance caused by the second hand 133 being over the GPS antenna 11 can be prevented.

Furthermore, because the second hand 133 moves to the 0-second position when reception starts, the second hand 133 is located away from the GPS antenna 11, and thus again reduces its effect on reception.

(6) If the reception level is displayed only when the reception process is manually initiated by operating the button A 6, and the reception level is not displayed when the time is adjusted automatically at a preset time, the reception level can be displayed only when needed by the user, thereby improving user convenience and reducing power consumption because it is not necessary to execute the reception level display process needlessly.

The invention is not limited to the embodiment described above.

For example, displaying the reception level is not limited to using the second hand 133, and the minute hand 132 may be moved to display the reception level. More particularly, in a timepiece with only two hands, an hour hand 131 and minute hand 132 and no second hand 133, the minute hand 132 may be moved to display (indicate) the reception level and reception result.

Figure 14A:
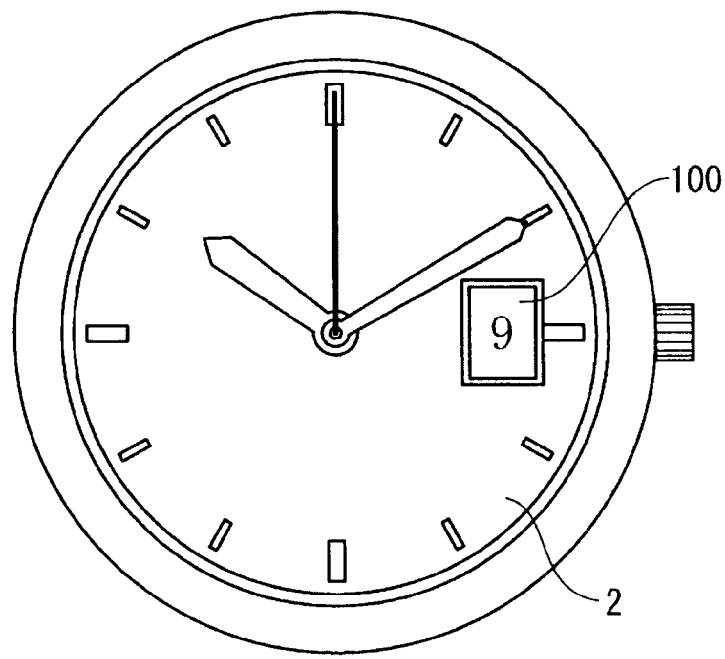
FIGS. 14A and 14B illustrate displaying the reception level in a second embodiment of the invention.
Figure 14B:
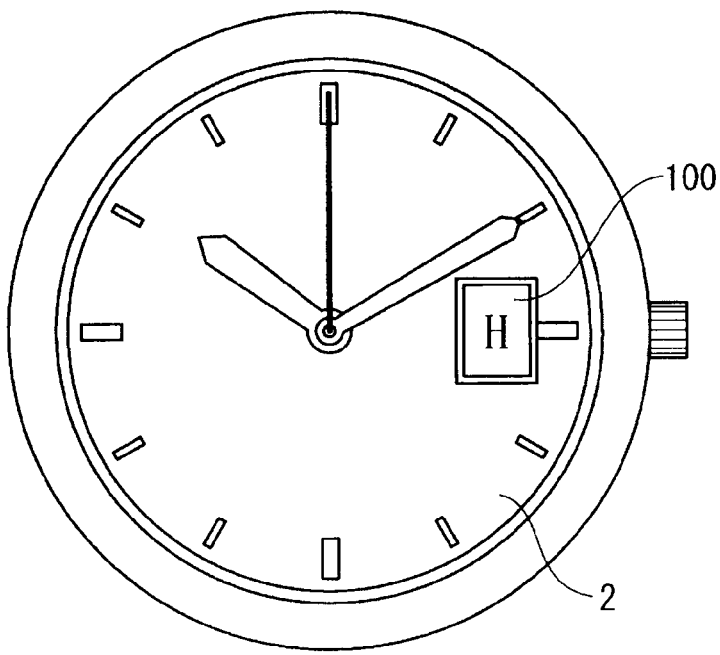

Further alternatively, if the timepiece has a calendar display such as a date wheel or a day wheel, the date wheel 100 may be driven to display the reception level or the reception result as shown in FIG. 14. Because this configuration displays a character (such as H, L, Y, or N) in a window in the dial 2 to display the reception level or reception result, this configuration has the benefit of making it easy for the user to determine the reception condition or the reception result.

The method of displaying the reception level is not limited to a physically driven device such as a hand or date wheel. More specifically, a reception state display such as a liquid crystal display device may be disposed to the GPS wristwatch 1, and the reception level may be displayed in this reception state display.

Because the invention does not display the reception level for each satellite and displays the reception level of the reception process executed in the positioning mode and the time adjustment mode in three levels, the configuration of the reception state display device can be simplified compared with the prior art method of separately displaying the reception level for each satellite. Therefore, because the reception state display device can simply display a single digit number to indicate the reception level of 0 to 2 when a display device is used, a small display device can be easily used and the display can be easily incorporated into small devices such as wristwatches.

Furthermore, while the reception level is evaluated in three stages, 0 to 2, in this embodiment of the invention, the reception level may be evaluated in two stages, such as Low (or 0) and High (or 1), or it may be evaluated using four or more levels.

The number of reception levels used may also be changed according to whether the positioning mode or the time adjustment mode is selected. For example, the reception level may be evaluated in three stages in the positioning mode while using only two stages in the time adjustment mode.

The criteria for determining the reception level are also not limited to those shown in Table 1. For example, when the positioning mode is selected, the reception level may be 0 when the number of located and captured satellites is less than 4; 1 when the number of satellites with an SNR greater than or equal to the predetermined level (such as 40) is 2 and the number of satellites with an SNR less than the predetermined level is 2 or more; 2 when the number of satellites with an SNR greater than or equal to the predetermined level is 3 and the number of satellites with an SNR less than the predetermined level is 1 or more; and 3 when the number of satellites with an SNR greater than or equal to the predetermined level is 4 or more.

In other words, the evaluation standard for the reception level may determine the reception level based on the number of satellites meeting a predetermined condition.

The number of satellites received for positioning in this embodiment of the invention is 4, but the number of satellites may be 3 if less precise positioning is acceptable. Furthermore, while the number of satellites received for positioning is normally set to 4, it may be set to 5 or more.

Likewise, while the number of satellites set for reception to adjust the time is set to 1 in the embodiment of the invention described above, it may be set to 2 or more.

When the reception level evaluation criteria are set for each reception stage, the criteria are not limited to those set for each stage shown in Table 2. For example, because the satellite search process ends in approximately 2 seconds, the satellite search stage and capture stage may be combined in a single reception stage, and the reception level may be determined based on the number of satellites and SNR in this reception stage.

Furthermore, because the final positioning process cannot be executed using only the Z count in the positioning mode, the Z count acquisition stage and ephemeris acquisition stage may be combined into a single reception stage, and the reception level may be determined based on the number of satellites and SNR in this reception stage.

The reception level evaluation criteria are set for each reception stage in this embodiment of the invention as shown in Table 2, but the criteria may be set without being separated into reception stages. For example, when satellite signals are simultaneously received on a plurality of channels, the reception level may be determined based on the number of GPS satellites 15 being received and the SNR of each satellite even if the reception process is at a different stage on each reception channel. The GPS satellites 15 from which signals are being received may therefore include a GPS satellite 15 in the middle of the satellite capture process and a GPS satellite 15 in the middle of the Z count acquisition process, but each of these satellites may be counted as a GPS satellite 15 from which signals are being received, the SNR of each satellite calculated, and the reception level determined.

The reception level evaluation criteria are also set separately for the positioning mode and the time adjustment mode in the foregoing embodiment of the invention, but the same criteria may be used in each mode. For example, the evaluation criteria used in the positioning mode of the foregoing embodiment may also be used in the time adjustment mode.

The location of the GPS antenna 11 is also not limited to the embodiment described above. More specifically, because the second hand 133 is relatively thin, the likelihood is high that the satellite signal can be received if the signal level is relatively high even if the second hand 133 is over the GPS antenna 11. The arrangement of the embodiment described above is preferable, however, because it can further improved reception performance.

The method of displaying the positioning information is also not limited to the method described in the foregoing embodiment, and more particularly a display device or a dedicated hand may be used to indicate the position. For example, a display device such as an LCD may be used instead of using subdials 4 and 5 to display the positioning information (longitude and latitude).

The positioning mode and the time adjustment mode are selected automatically according to the currently selected display mode of the subdials 4 and 5 when reception is manually started in the embodiment described above, but the positioning mode and time adjustment mode may be selected based on differences in user input. For example, the positioning mode reception process may be selected when button A 6 is pressed continuously for 3 seconds or more, and the time adjustment mode reception process may be selected when button B 7 is pressed continuously for 3 seconds or more.

The foregoing embodiments are described with reference to a GPS satellite as an example of a positioning information satellite, but the positioning information satellite of the invention is not limited to GPS satellites and can be used with Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

The satellite signal reception device of the invention is also not limited to a wristwatch 1 as described above, and may be used in pocket watches and other types of timepieces, cell phones, digital cameras, and other types of portable data terminals, and navigation systems. The embodiment of the invention described above has both a positioning mode and a time adjustment mode, but the satellite signal reception device may have only one of these modes depending on the intended application.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A satellite signal reception device comprising:
a reception unit that receives one or more satellite signals transmitted from one or more positioning information satellites;
a reception state evaluation unit that determines a level of a reception state of the satellite signal(s) received by the reception unit;
a reception state display device for displaying the level of the reception state; and
a display controller that controls the reception state display device to display the reception state determined by the reception state evaluation unit; wherein
the reception state evaluation unit determines the level of the reception state based on the number of positioning information satellites from which satellite signal(s) are received and the signal level of each received signal, and
the display controller controls the reception state display device to display the reception state when reception is triggered manually and does not control the reception state display a device to display the reception state when reception starts automatically.

2. The satellite signal reception device described in claim 1, wherein:
the reception state dispalay device includes a mechanical drive unit and a time display device that is driven by the mechanical drive unit to display time;
the time display device includes a hand driven by the mechanical drive unit and a dial; and
the display controller moves the hand to a specific position by controlling the mechanical drive unit when reception starts.

3. The satellite signal reception device described in claim 2, wherein:
the hand is a second hand; and
the specific position is an 0-second position.

4. The satellite signal reception device described in claim 1, wherein:
the reception state display device includes a mechanical drive unit and a time display device that is driven by the mechanical drive unit to display time;

the time display device includes a hand driven by the mechanical drive unit and a dial;

the reception unit includes an antenna for receiving the satellite signal(s);

the display controller moves the hand to one of a plurality of positions corresponding to the level of the reception state; and the positions are set so that the hand does not overlap the antenna in plan view.

* * * * *